March 16, 1954     T. B. JOCHEM     2,672,579
ROTARY SHAFT MULTIPOSITION ELECTRICAL CONTROLLER
Filed July 3, 1950     11 Sheets-Sheet 1

Inventor
Theodore B. Jochem
By W. C. Lyon
Attorney

Fig. 2

SWITCH COMMUTATION SCHEDULE

| STEP NO. | VERNIER RESISTOR SWITCHES | | MAIN RESISTOR SWITCHES | |
|---|---|---|---|---|
| | OPEN | CLOSE | OPEN | CLOSE |
| 1 | ALL | | ALL | |
| 2 | | 27 | | |
| 3 | | 38 | | |
| 4 | | 49 | | |
| 5 | | 28 | | |
| 6 | 27 | 39 | | |
| 7 | 38 | 50 | | |
| 8 | 49 | 29 | | |
| 9 | 28 | 40 | | |
| 10 | 39 | 51 | | |
| 11 | 50 | 30 | | |
| 12 | 29 | 41 | | |
| 13 | 40 | 52 | | |
| 14 | 51 | 31 | | |
| 15 | 30 | 42 | | |
| 16 | 41 | 53 | | |
| 17 | 52 | 32 | | |
| 18 | 31 | 43 | | |
| 19 | 42 | 54 | | |
| 20 | 53 | | | |
| 21 | 32 | | | 33 & 36 |
| 22 | 43 | | | 44 & 47 |
| 23 | 54 | | | 55 & 58 |
| 24 TO 42 | REPEAT STEPS 2 TO 20 | | | |
| 43 | 32 | | | 34 |
| 44 | 43 | | 33 | 45 |
| 45 | 54 | | 44 | 56 |
| 46 TO 64 | REPEAT STEPS 2 TO 20 | | | |
| 65 | 32 | | 55 | 35 & 37 |
| 66 | 43 | | 34 & 36 | 46 & 48 |
| 67 | 54 | | 45 & 47 | 57 & 59 |
| 68 TO 85 | REPEAT STEPS 2 TO 19 | | | |

Inventor
Theodore B. Jochem
By W.E. Lyon
Attorney

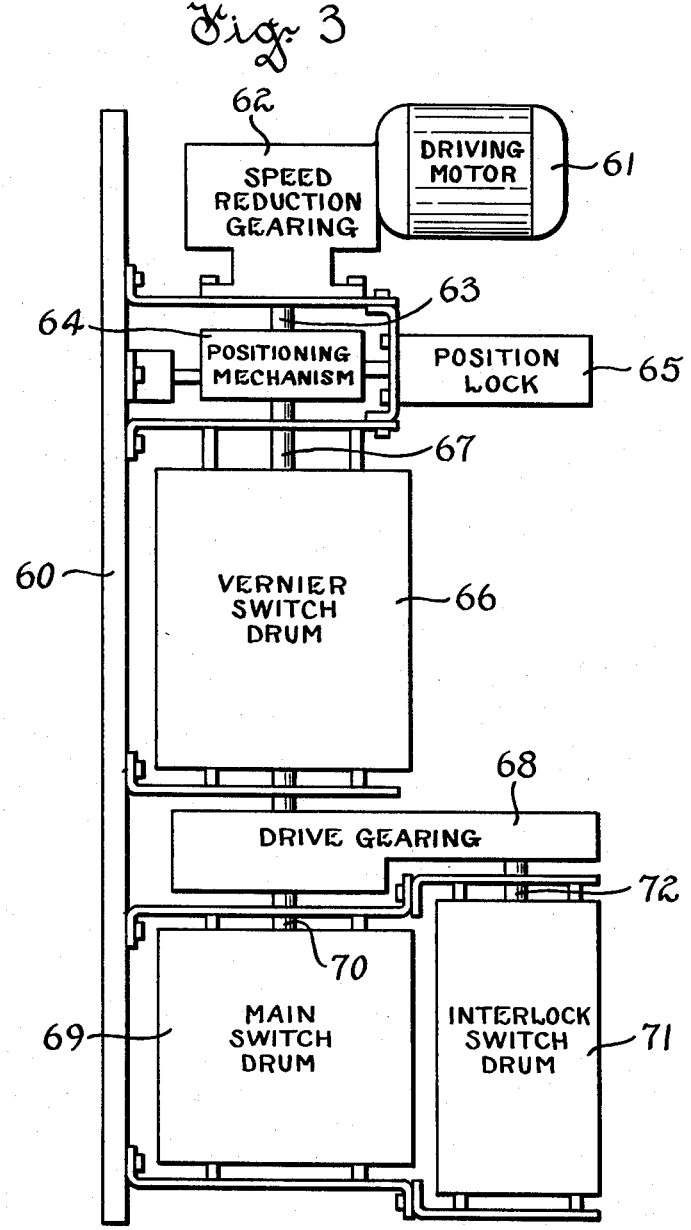

March 16, 1954  T. B. JOCHEM  2,672,579
ROTARY SHAFT MULTIPOSITION ELECTRICAL CONTROLLER
Filed July 3, 1950 11 Sheets-Sheet 4
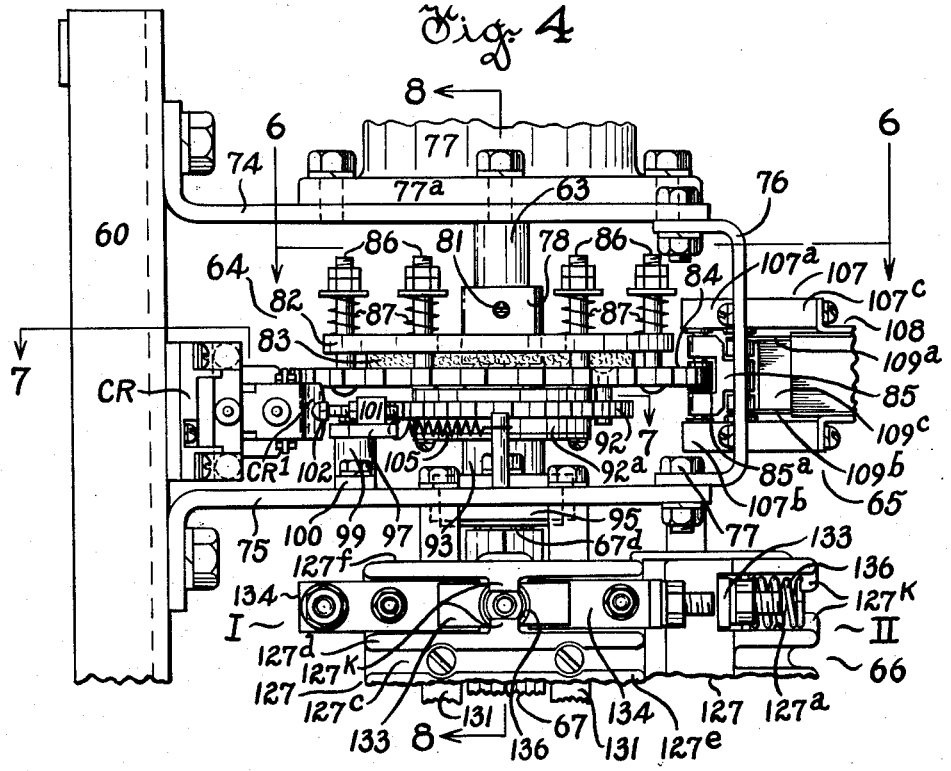
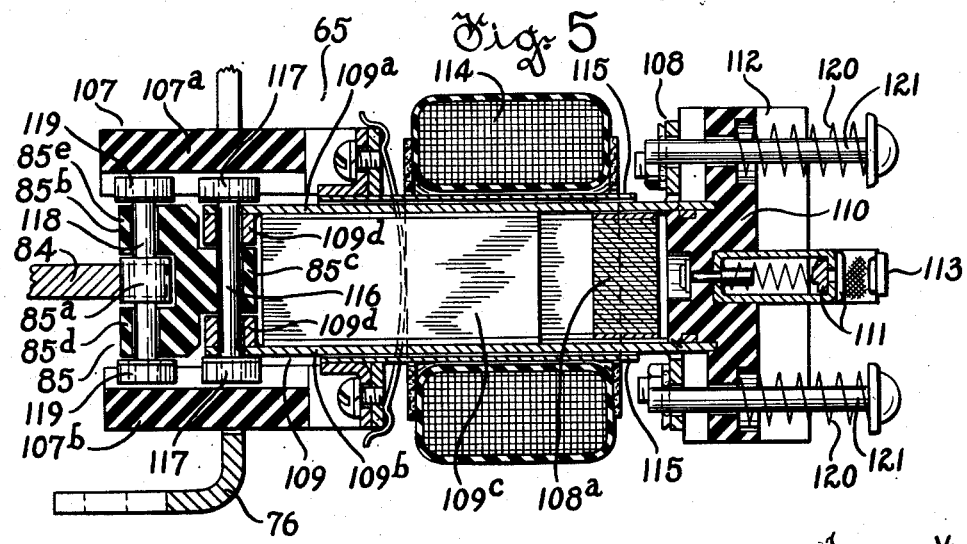
Inventor
Theodore B. Jochem
By W. C. Lyon
Attorney

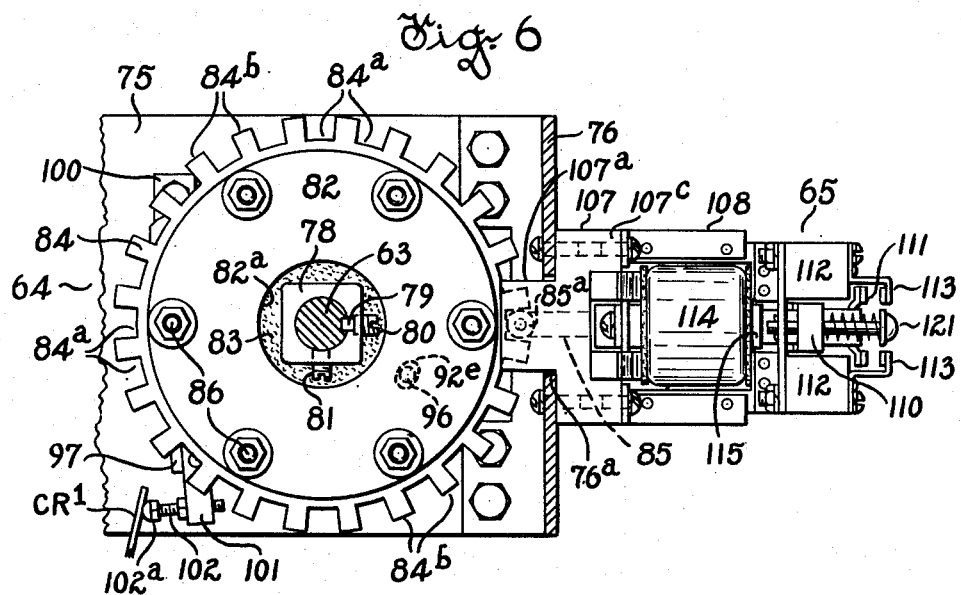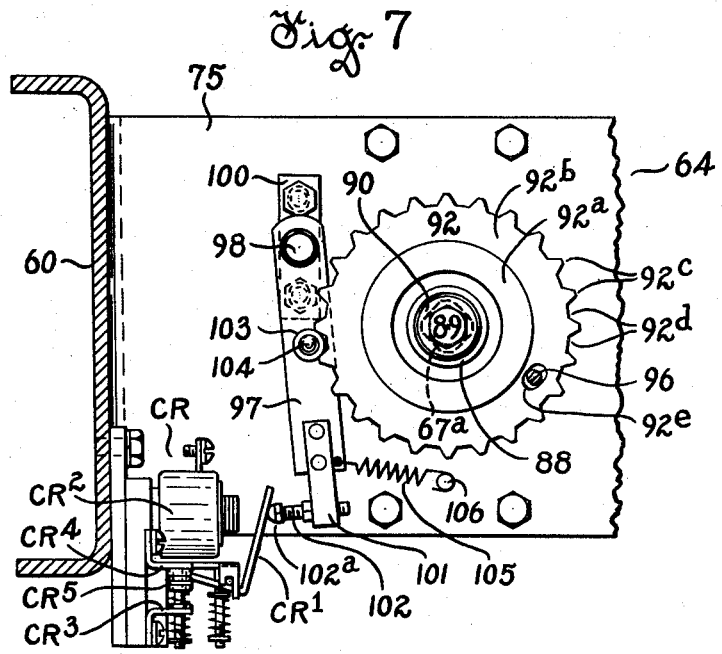

March 16, 1954 T. B. JOCHEM 2,672,579
ROTARY SHAFT MULTIPOSITION ELECTRICAL CONTROLLER
Filed July 3, 1950 11 Sheets-Sheet 6

Inventor
Theodore B. Jochem
By W. C. Lyon
Attorney

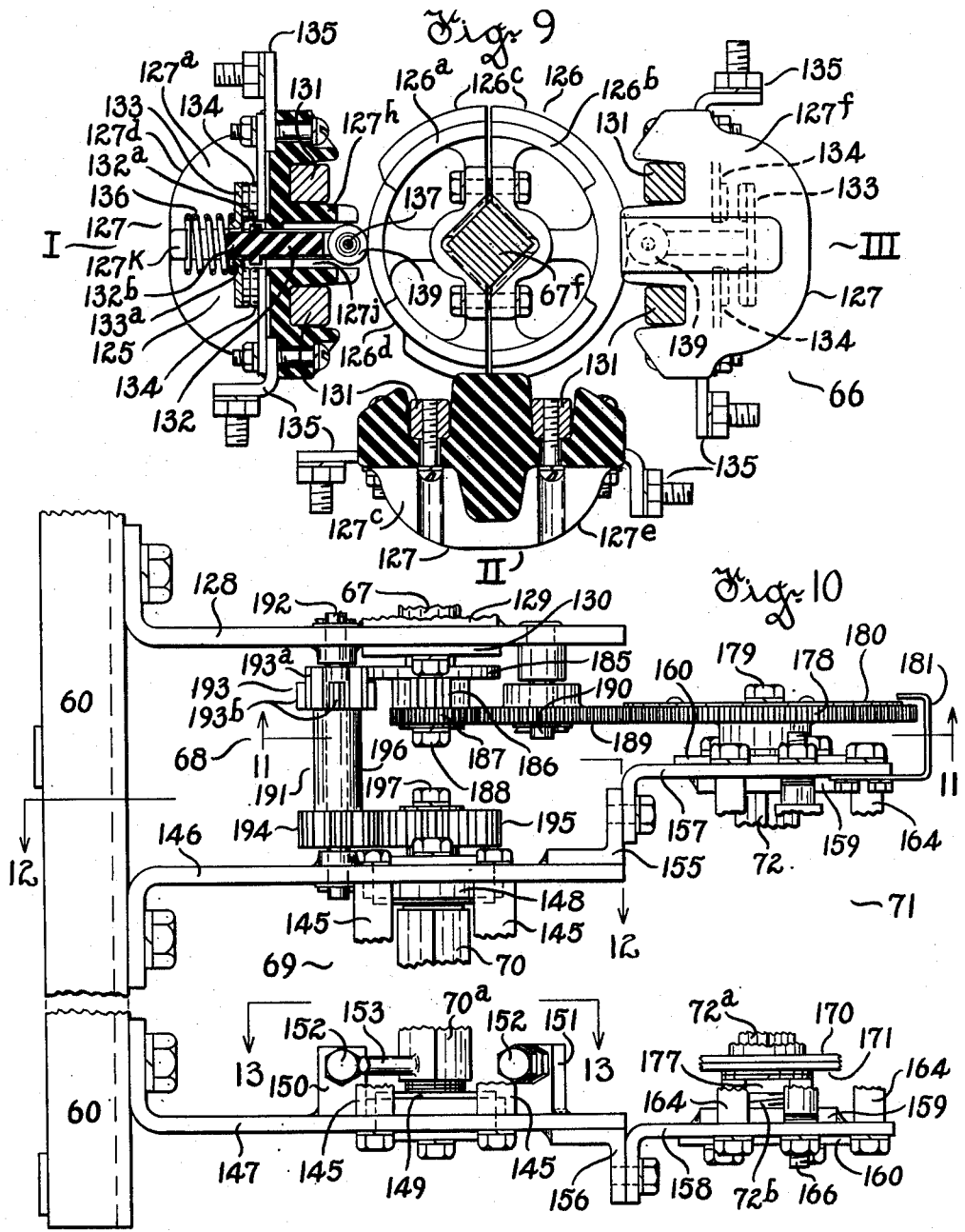

March 16, 1954 T. B. JOCHEM 2,672,579
ROTARY SHAFT MULTIPOSITION ELECTRICAL CONTROLLER
Filed July 3, 1950 11 Sheets-Sheet 8
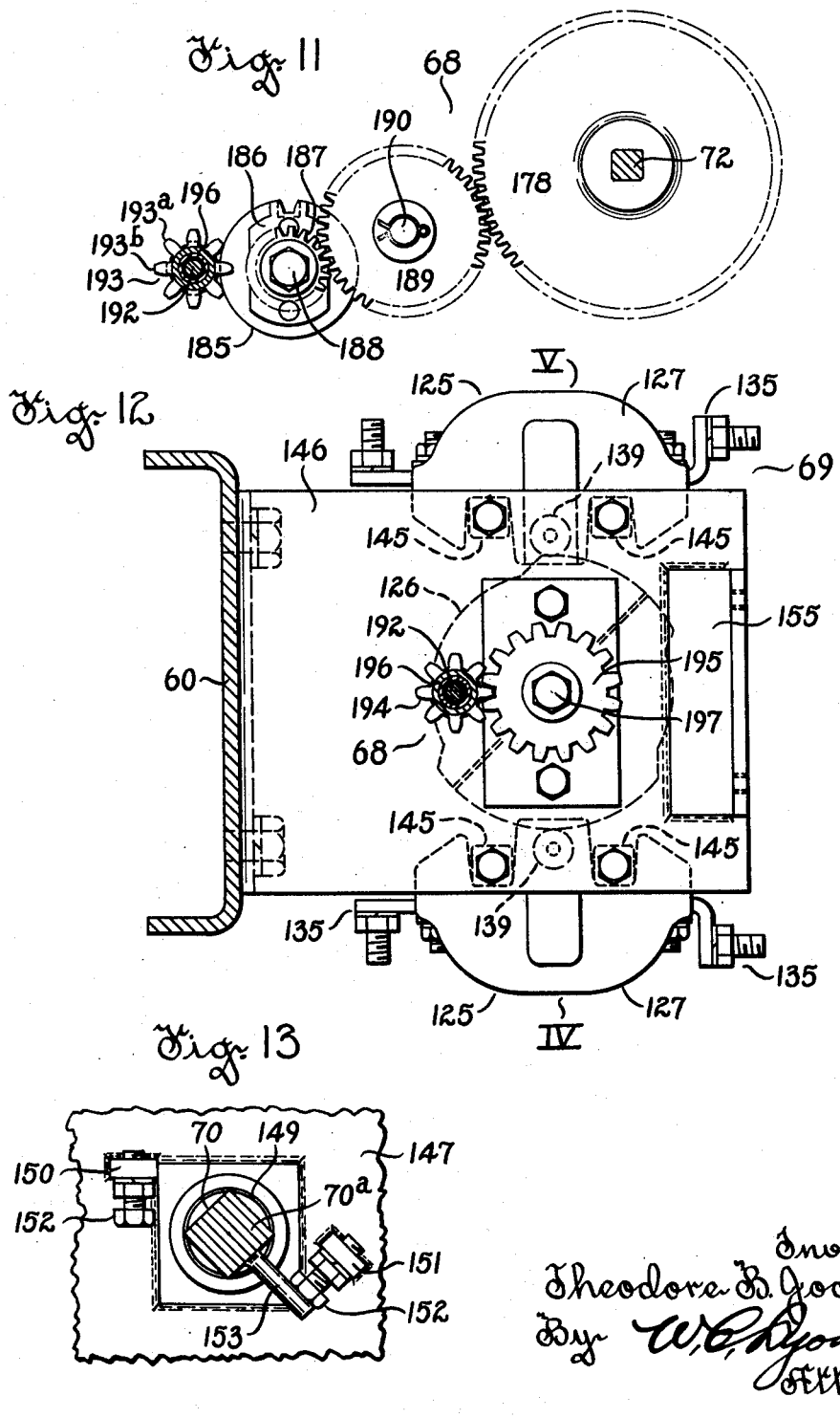

March 16, 1954 T. B. JOCHEM 2,672,579
ROTARY SHAFT MULTIPOSITION ELECTRICAL CONTROLLER
Filed July 3, 1950 11 Sheets-Sheet 9
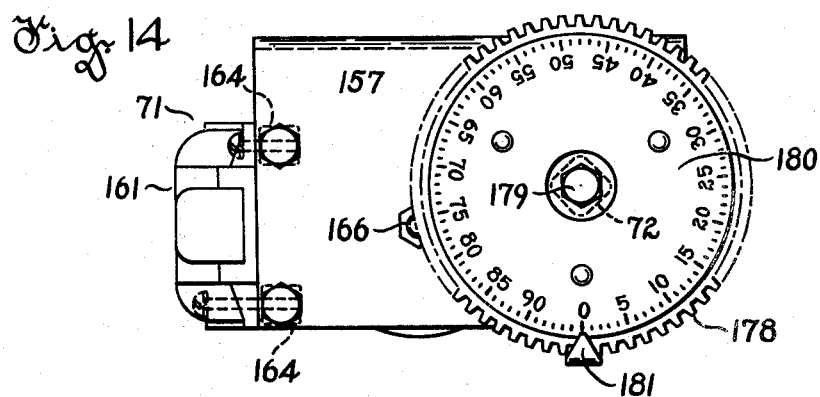
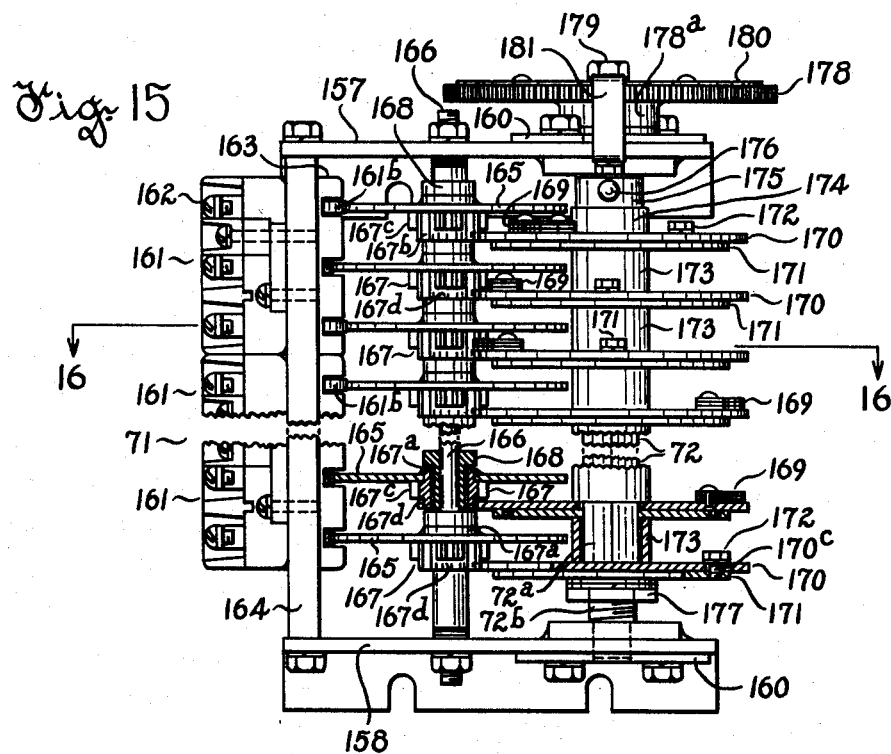
Inventor
Theodore B. Jochem
By W. C. Sujou
Attorney

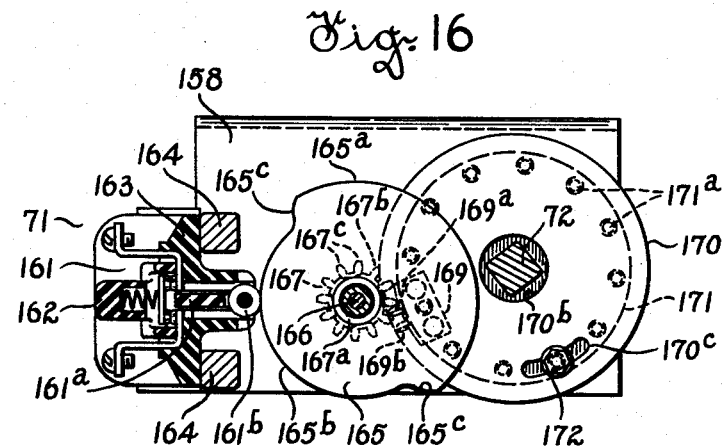
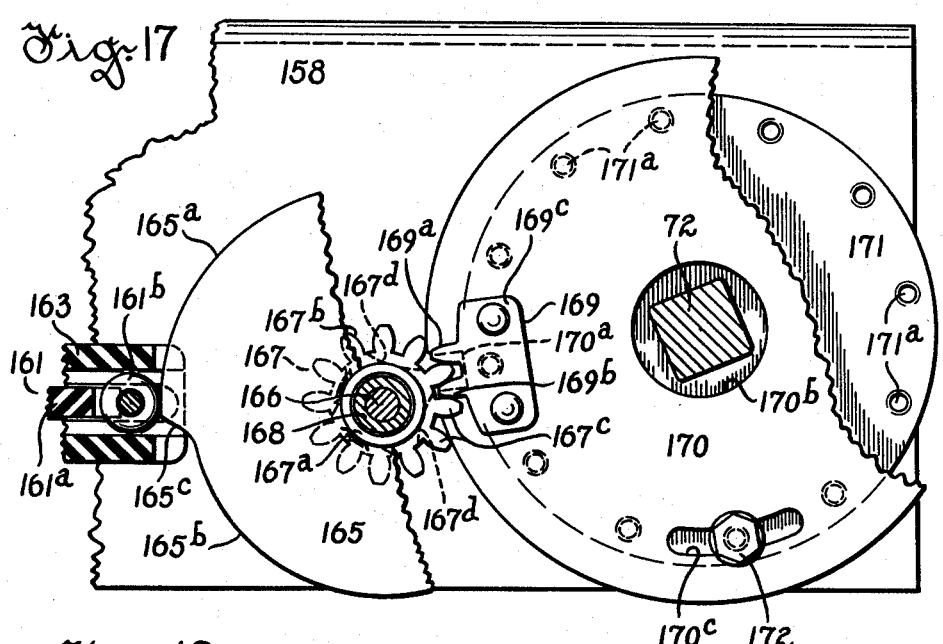
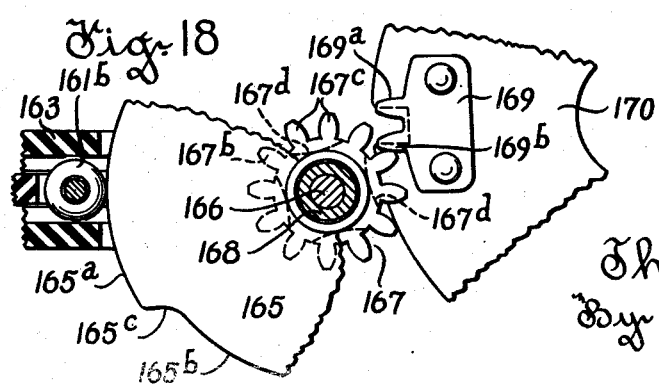

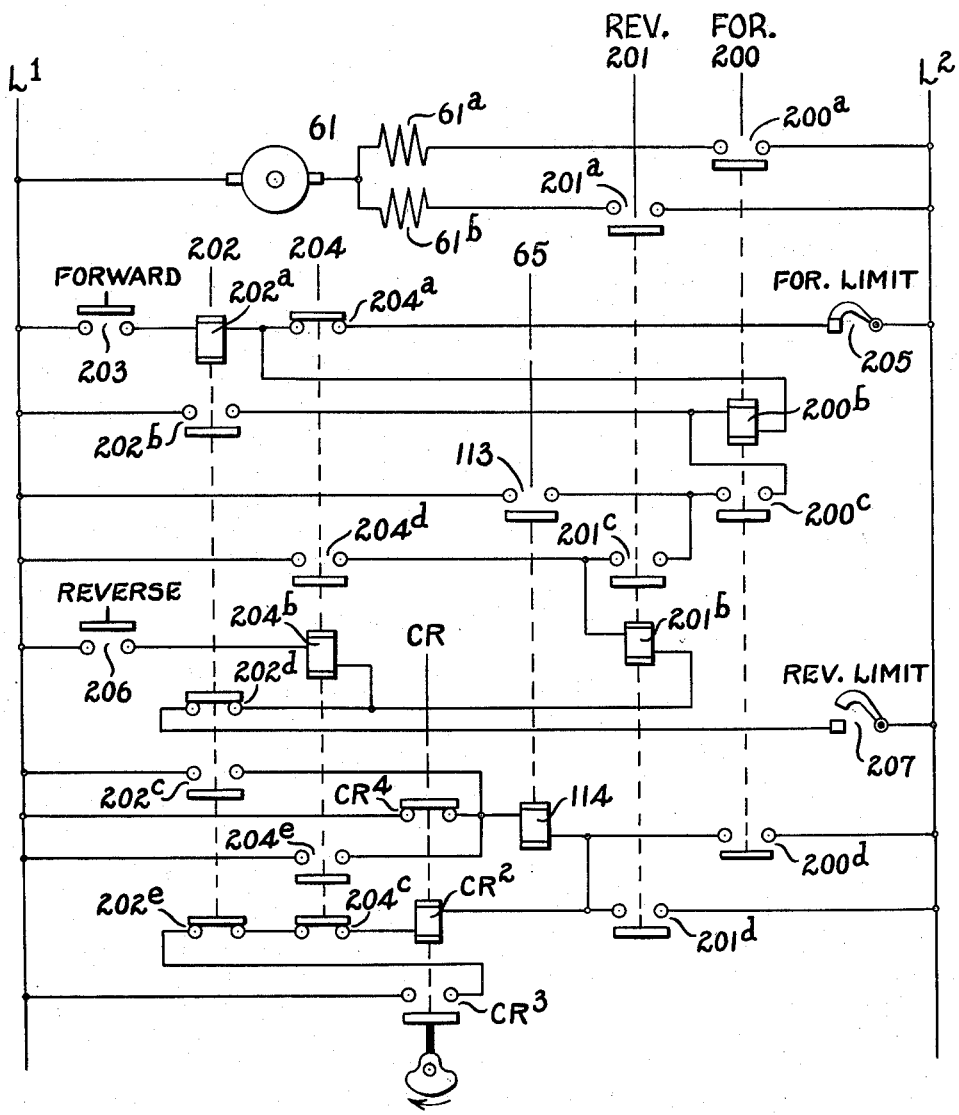

Patented Mar. 16, 1954

2,672,579

UNITED STATES PATENT OFFICE 2,672,579

ROTARY SHAFT MULTIPOSITION ELECTRICAL CONTROLLER

Theodore B. Jochem, Wauwatosa, Wis., assignor to Cutler-Hammer, Inc., Milwaukee, Wis., a corporation of Delaware Application July 3, 1950, Serial No. 171,854

29 Claims. (Cl. 317—157)

1

This invention relates to an electrical controller of the rotary shaft, multi-position type.

While not limited thereto the present controller is particularly adapted for controlling the speed of a driving motor of a printing press and for controlling auxiliaries of such printing press.

Large printing presses are commonly afforded main driving power by polyphase wound rotor induction motors, and it is required that such motors be afforded a great number of definite operating speeds between 25% and 100% rated speed so that a corresponding number of speeds for the printing press will be afforded. Speed control of such motors is usually obtained by providing a network of external resistors in circuit with the motor secondary and commutating such resistors into and out of circuit in a predetermined manner. Where a great number of definite operating speed points for the motor is desired, which differ in small increments and decrements, this requires that a large number of resistors be used in the external network and the attendant circuit wiring becomes rather complex. It is a primary object of this invention to provide a controller, which in conjunction with a preferred type of network of external resistors, is adapted to effect commutation of such resistors in a multiplicity of steps, such as will afford a great number of definite operating speeds for a wound rotor induction motor driving a printing press with a substantial reduction in the number of external resistors and circuit wiring required.

Another object is to provide a controller of the aforementioned type which in addition is adapted to control the auxiliaries of a printing press.

A further object is to provide a controller of the aforementioned type which is compact and permits ready access to and replacement of its electrical switching components.

A still further object is to improve the details of construction and operation of the various component parts of a controller of the aforementioned character.

Other objects and advantages of the invention will hereinafter appear.

The accompanying drawings illustrate a preferred embodiment of the invention which will now be described, it being understood that the embodiment shown is susceptible of modification in respect of its details without departing from the scope of the appended claims.

In the drawings:

Figure 1 diagrammatically depicts a three phase wound rotor induction motor and control means for the primary and secondary thereof.

Fig. 2 is a table indicating a preferred sequence for commutating the external secondary resistance for the motor shown in Fig. 1.

2

Fig. 3 shows more or less schematically a preferred motor operated controller for effecting the commutations set forth in Fig. 2.

Fig. 4 is a fragmentary view in side elevation showing the details of a positioning mechanism of the controller of Fig. 1.

Fig. 5 is a view in vertical section showing details of the position locking mechanism of the controller of Fig. 1.

Fig. 6 is a view taken along the line 6—6 of Fig. 4.

Fig. 7 is a view taken substantially along the line 7—7 of Fig. 4.

Fig. 9 is a sectional view taken substantially along the line 9—9 of Fig. 8.

Fig. 10 is a fragmentary view in side elevation showing the drive mechanism between the vernier switch drum and the main and interlock switch drums of the controller of Fig. 1.

Fig. 11 is a view taken along the line 11—11 of Fig. 10 showing a portion of the drive mechanism.

Fig. 12 is a view taken substantially along the line 12—12 of Fig. 10 showing another portion of the drive mechanism.

Fig. 13 is a view taken along the line 13—13 of Fig. 10 showing certain details of the main switch drum.

Fig. 14 is a view in top plan of the interlock switch drum.

Fig. 15 is a view in side elevation of the interlock switch drum.

Fig. 16 is a view taken substantially along the line 16—16 of Fig. 15.

Fig. 17 is an enlarged fragmentary view, similar to Fig. 16, but showing certain portions cut away and certain of the parts in a different operating relation.

Fig. 18 is similar to Fig. 17, but showing certain of the parts in a still different operating position, and Fig. 19 diagrammatically depicts an electrical control system for the controller driving motor.

Figure 1:
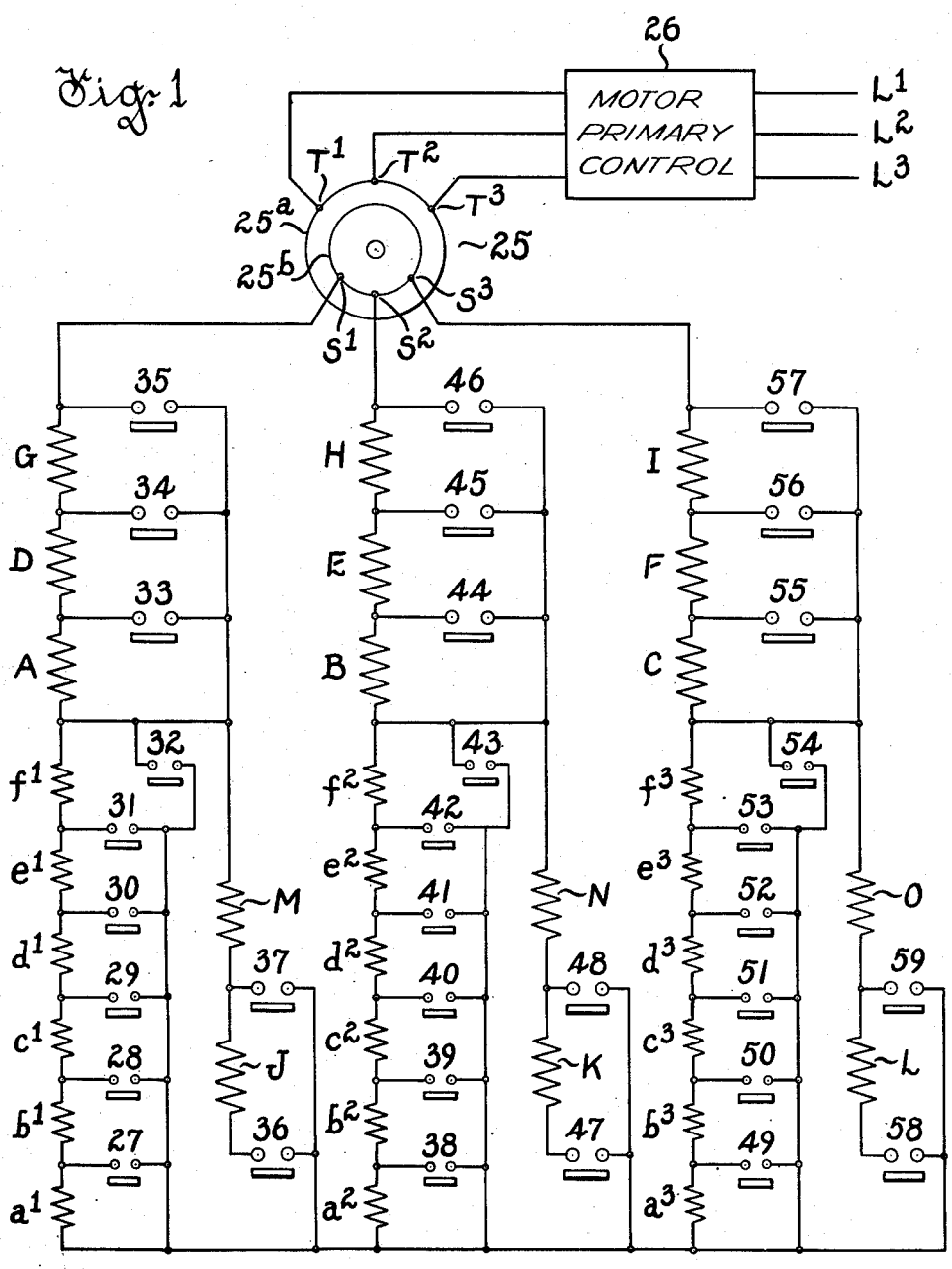

Referring to Fig. 1, it shows a three phase wound rotor induction motor 25 having a primary 25$^a$ and a secondary 25$^b$. Primary 25$^a$ is provided with terminals $T^1$, $T^2$ and $T^3$ which are connectable to supply lines $L^1$, $L^2$ and $L^3$, respectively, of a three phase alternating current source through the medium of motor primary control 26 of any preferred type. The secondary 25$^b$ of motor 25 is provided with external terminals $S^1$, $S^2$ and $S^3$ through the medium of which the speed of the motors is adapted to be controlled by connection of external resistance in varying amounts with each of the latter terminals. When a motor, like motor 25 is used for driving a printing press or the like, it is desired that it be suitably controlled by commutation of external resistance in each of the phases of the secondary to afford a multiplicity of speed points between 25% and 100% rated speed. A preferred network of secondary resistors and commutating means therefor which affords the motor eighty-two separate speed points between 25% and 100% rated speed with a minimum of resistors and wiring will now be described.

Terminal $S^1$ has permanently connected thereto a series arrangement vernier resistors $a^1$, $b^1$, $c^1$, $d^1$, $e^1$ and $f^1$ and main resistors A, D and G. Other main resistors J and M are also connectable in parallel with said vernier resistor and in series with said main resistors. Terminal $S^2$ likewise has permanently connected thereto in series circuit vernier resistors $a^2$, $b^2$, $c^2$, $d^2$, $e^2$, $f^2$ and main resistors B, E and H. Other main resistors K and N are connectable in parallel with the last mentioned vernier resistors and in series with the main resistors B, E and H. Similarly, terminal $S^3$ has permanently connected thereto in series arrangement vernier resistors $a^3$, $b^3$, $c^3$, $d^3$, $e^3$, $f^3$ and main resistors C, F and I. Other main resistors L and O are connectable in parallel with the last mentioned vernier resistors and in series with main resistors C, F and I.

The vernier resistors $a^1$, $a^2$ and $a^3$ have connection with each other in Y or star arrangement.

Associated with each of the resistors aforescribed, except main resistors J and M, K and M, and L and O, are shunting means including normally open switches which when closed provide for effecting shunting that resistor and all resistors below it from the network. More particularly, vernier resistors $a^1$, $b^1$, $c^1$, $d^1$, $e^1$ and $f^1$ have associated therewith normally open switches 27, 28, 29, 30, 31 and 32 and main resistors A, D and G have associated therewith normally open switches 33, 34 and 35. Vernier resistors $a^2$, $b^2$, $c^2$, $d^2$, $e^2$ and $f^2$ have associated therewith the normally open switches 38, 39, 40, 41, 42 and 43, respectively, and main resistors B, E and H have associated therewith the normally open switches 44, 45 and 46. Vernier resistors $a^3$, $b^3$, $c^3$, $d^3$, $e^3$ and $f^3$ have associated therewith the normally open contacts 49, 50, 51, 52, 53 and 54, respectively, and main resistors C, F and I have associated therewith the normally open switches 55, 56 and 57, respectively.

Main resistors J and M have associated therewith the normally open switches 36 and 37. With switch 36 closed and switch 37 open, both of the main resistors J and M are placed in parallel with the vernier resistors $a^1$ to $f^1$, whereas if switch 37 is closed only resistor M is so included. Main resistors K and N likewise have normally open switches 47 and 48 which perform the same function in respect of vernier resistors $a^2$ to $f^2$ as switches 36 and 37. Similarly, main resistors L and O have associated therewith the normally open switches 58 to 59 which perform the same functions as switches 36 and 37 aforedescribed.

Referring to Fig. 2, it shows a schedule for commutation of normally open switches 27 to 59, which if allowed will afford eighty-two separate operating speed points for motor 25. It will be noted that while eighty-two different speed points are afforded, that eighty-five steps of switch commutations are required in going from a condition of maximum motor secondary resistance to a condition of zero external motor secondary resistance and vice versa. The repeated commutation of aforedescribed vernier resistors in going from step 2 to 20, step 24 to 42, step 46 to 64, and step 68 to 85 as indicated in Fig. 2, makes possible saving in the number of resistors, shunting switches and wiring needed. The change in speed, in going from one speed point to the next higher or lower speed point, of course depends upon the values of the resistors shunted in or out of circuit. It is, of course, desirable that the resistance values of the main and vernier resistors be suitably selected so that in effecting change in speed of motor 25 according to the schedule of commutations of Fig. 2 the speed change will be substantially linear.

Referring to Fig. 3, it shows a motor driven controller which is particularly adapted for effecting commutation of the secondary resistance switches, shown and described in connection with Fig. 1, in accordance with the commutation schedule of Fig. 2, and which affords other switch commutations that may be needed in the control of a motor, like the motor 25, and for control of auxiliary apparatus on a printing press or the like. The schematic showing in Fig. 3 depicts the general arrangement and coordination of the major components of the controller. Such major components comprise a main supporting member 60, an electric driving motor 61, speed reduction gearing 62, a drive shaft 63, positioning mechanism 64, position lock 65, a vernier switch drum 66, an operating shaft 67 for drum 66, gear drive mechanism 68, a main switch drum 69, an operating shaft 70 for drum 69, an interlock switch drum 71, and an operating shaft 72 for drum 71.

*General arrangement of the controller*

The controller is afforded drive in reverse directions by motor 61, which in one preferred form is a split field, single phase alternating current motor. A preferred control system for controlling the energization of motor 61 in drive of the controller will be hereinafter described in detail.

Drive shaft 63 is driven by motor 61 but at greatly reduced speed through the medium of speed reduction gearing 62; the speed of shaft 63 preferably being in the range of 5 to 15 R. P. M. As most any speed reducing gearing affording the desired speed reduction between motor 61 and shaft 63 can be used, detailed description of the same will not be made.

Drive of operating shaft 67 of vernier drum 66 from drive shaft 63 is through positioning mechanism 64. Positioning mechanism 64, which will be hereinafter described in detail, insures that following operation of the controller to effect a new operating position, operating shafts 67, 70 and 72 of vernier, main and interlock switch drums 66, 69 and 71, respectively, will always be so positioned that the switches of the respective drums will be either fully opened or fully closed. Positioning mechanism 64 is so constructed that it affords twenty-four definite operating positions for operating shaft 67 in one revolution of the latter.

Position lock 65 comprises an electromagnetically controlled plunger which cooperates with a certain part of positioning mechanism 64 to lock the controller in definite operating positions, wherein the main, vernier and interlock drum switches are fully opened or fully closed.

Vernier switch drum 66 comprises eighteen separate self-contained switch units which are arranged in three vertical rows disposed in an arc about operating shaft 67. Each such row of switches comprises six switch units. Operating shaft 67 is provided with six switch operating cams; each such cam being operatively associated with the three switches in a common tier. The surfaces on the cams are so cut that 15° of rotation of shaft 67 (corresponding to movement between one and another definite operating position) is required for opening or closing a switch. Further, the cam surfaces are so cut that upon rotation of shaft 67 in one direction from a given starting operating position to the third operating position no commutation of any of the 18 switches of drum 66 is effected; each of the switches then being in open circuit condition. Rotation of shaft 67 in said one direction from the 3rd to the 23rd operating position, corresponding to movement through 20 operating positions, will effect commutation of each of the eighteen switches in any desired sequence, such as for example, in accordance with the preferred switch commutation schedule indicated between steps 1 to 23 of Fig. 2. Rotation of drive shaft 67 in the reverse direction from said given starting operating position effects commutation of the eighteen switches in the reverse sequence.

Operating shaft 70 of main switch drum 69 is afforded drive through a rotary angle of 45° once each revolution of operating shaft 67, through the medium of an interrupted gear tooth mechanism forming a part of gear drive mechanism 68. Rotation of shaft 70 through the angle of 45° occurs in three successive 15° steps, and, only when shaft 67 is rotating to complete the last 45° of a single revolution in said one direction thereof from its given starting operating position, or, when shaft 67 is rotated the first 45° from its given starting operating position in the opposite direction.

Main switch drum 69 is similar in construction to vernier switch drum 66, but comprises sixteen separate switch units arranged in two vertical rows. Each vertical row comprises 8 switch units. Operating shaft 70 is provided with eight switch operating cams like the cams carried on shaft 67 of vernier switch drum 66. It may be assumed that fifteen of the switches of drum 69 correspond to the fifteen switches, 33 to 37, 44 to 48, and 55 to 59 required for commutation of main resistors A to O shown in Fig. 1, and further, that such fifteen switches will be afforded commutation during rotation of operating shaft 70 through 135° in accordance with steps 21 to 23, 43 to 45, and 65 to 67 of the schedule of Fig. 2. Drum 69 is provided with mechanical stops which limit the rotation of operating shaft 70 through an angle of 135° in reverse directions, thereby also limiting the rotation of operating shaft 67 of vernier switch drum 66 to 3⅞ revolutions in reverse directions.

Operating shaft 72 of interlock switch drum 71 derives its drive from shaft 67 of vernier switch drum 66 through a gear reduction drive, forming a part of drive gearing 68. Shaft 72 is afforded a drive at one-quarter the angular velocity of shaft 67 and rotates whenever the latter is rotating. Thus for every 15° of rotation of shaft 67, shaft 72 rotates correspondingly through an angle of 3¾°.

Interlock switch drum 71, which is essentially different in arrangement and construction from drums 66 and 69, is provided with a plurality of self-contained switches. Operation of the switches of drum 71 is effected by rotation of shaft 72. As will be later more fully described, each of the switches of drum 71 has actuating means individual thereto and said means are adjustable so that commutation of a switch may be set as desired at any one of ninety-four different operating positions of shaft 72 which are spaced at a rotary angle of 3¾°. With respect to the control system of Fig. 1, it may be assumed that the switches of drum 71 serve no direct purpose. Two of the switches of drum 71, as will be hereinafter explained, are preferably utilized as limit switches in the preferred control system for controlling the energization of driving motor 61 of the controller. Other of the switches of drum 71 may be used for effecting commutations of auxiliary control circuits for a machine which may be driven by the motor 25 of Fig. 1, such as a printing press or the like.

In order to provide a more complete understanding of the controller, the structural details of positioning mechanism 64, position lock 65, vernier switch drum 66, main switch drum 69, drive gearing 68, interlock switch drum 70, and the aforementioned control system for controlling the operation of driving motor 61 will now be described hereinafter under appropriate headings.

*Positioning mechanism and position lock*

Preferred forms for positioning mechanism 64 and position lock 65 are shown in Figs. 4 to 8, inclusive.

The components comprising the positioning mechanism are partially enclosed between the main support 60, which is preferably of channel form in horizontal cross section as shown in Fig. 7, a pair of L-shaped brackets 74 and 75, rigidly secured to and extending at a right angle from support 60, and a bracket 76, which is of channel form in vertical cross section as shown in Fig. 4, and which is rigidly secured to brackets 74 and 75 adjacent the outer ends of the latter brackets.

Figure 8:
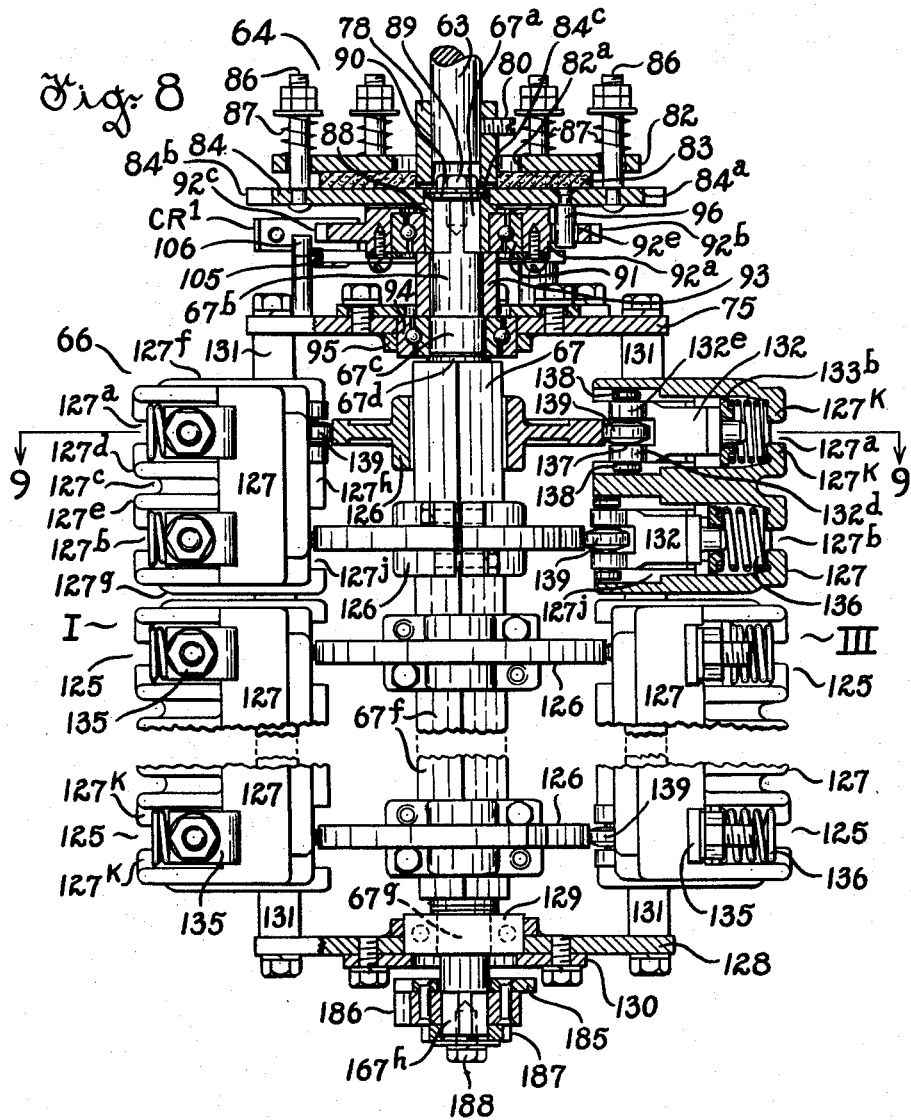
Fig. 8 is a view taken substantially along the line 8—8 of Fig. 4, partially in side elevation and partially in vertical section, of certain parts of the positioning mechanism and vernier switch drum of the controller of Fig. 1.

Speed reducing gearing 62, is provided with a housing 77 having a flange 77ª seating against and rigidly secured to the upper surface of bracket 74. Drive shaft 63 extends through a suitable clearance opening formed in bracket 74 and adjacent its lower end has a coupling member 78 non-rotatably secured thereto. Coupling 78 is preferably square in horizontal cross section as shown in Fig. 6, and is provided with a circular opening extending therethrough within which shaft 63 extends. Coupling 78 is non-rotatably secured to shaft 63 by a key 79 fitting in alined keyways in shaft 63 and coupling 78, and by a set screw 80 taking into a threaded opening formed in coupling 78 and bearing against one side of key 79. Another set screw 81 is preferably used in conjunction with coupling 78 and shaft 63 to insure good non-rotatable securement to each other. As best shown in Figs. 6 and 8, coupling 78 projects through a central clearance opening 82ª formed in an annular clutch disc 82 and adjacent its lower end tightly engages a circular disc 83 within a complementally formed square opening in the latter. Disc 83 is formed of a friction material, like that used for brake linings and clutch facings, and on its lower face engages with the upper surface of a position indexing wheel 84.

Indexing wheel 84 is provided with 24 slots 84ª and a corresponding number of complementally formed teeth 84ᵇ. The slots 84ª are spaced at equal radial angles of 15° about the periphery of wheel 84 and are substantially rectangular in form. As will be hereinafter more fully explained, a roller 85ᵃ of a plunger 85 forming a part of the position lock 65, is adapted to project within any one of the slots 84ᵃ of wheel 84 and lock the controller against operation.

As best shown in Figs. 6 and 8, wheel 84 is provided with six circular openings spaced at equal radial angles of 60° and lying adjacent the inner ends of the slots 84ᵃ. Each of the latter openings accommodates reduced portions of cylindrical pins 86 which are riveted over against the lower surface of wheel 84 and which project upwardly at a right angle from the latter and through clearance openings formed in clutch disc 82. The shanks of pins 86 extend a substantial distance beyond the upper surface of disc 82 and are threaded adjacent their upper ends. Compression springs 87 are positioned about each of the shanks of pins 86 and seat at their lower ends against the upper surface of disc 82. At their upper ends, springs 87 seat against annular washers and are constrained in partially compressed condition by pairs of nuts taking onto the threaded end portions of pins 86.

As best shown in Fig. 8, indexing wheel 84 is provided with a central circular opening 84ᶜ to accommodate in tightly fitting engagement the upper cylindrical end portion of a flanged, cylindrical hub member 88. The flange of member 88 seats and is welded to the lower surface of wheel 84. Member 88 is provided with an opening, extending therethrough, which is substantially square in horizontal cross section. The upper end portion 67ᵃ of operating shaft 67 is corresponding square form in horizontal cross section and the member 88 fits about said portion of said shaft and is thereby locked against relative rotation with respect thereto. The assembly comprising wheel 84 and member 88 is secured against movement axially of shaft 67 by a bolt 89 which takes into a threaded recess formed in the upper end of shaft 67, bolt 89 having a head bearing against a shouldered washer 90 that in turn bears against the upper end of member 88.

The hereinbefore described arrangement with respect to clutch disc 82, friction disc 83 and indexing wheel 84 affords a slip-clutch driving connection between drive shaft 63 and operating shaft 67 of vernier switch drum 66. The purpose of this slip-clutch driving connection will be hereinafter explained.

As best shown in Fig. 8, member 88 has a lower cylindrical portion on which is press-fitted the inner race of a ball bearing 91. The outer race of bearing 91 is press-fitted to a hub portion 92ᵃ of a ratchet wheel 92 within a circular opening formed therein. Hub portion 92ᵃ is provided with an inwardly extending flange overlying the upper end of said opening and bearing 91 is adapted to seat thereagainst. An annular ring is secured to the lower surface of hub portion 92ᵃ to retain bearing 91 in seating relation within said hub portion.

The assembly comprising ratchet wheel 92 and ball bearing 91 is constrained against downward movement on hub 88 by an annular spacing collar 93 positioned about the cylindrical portion 67ᵇ of operating shaft 67. Collar 93 at its lower end seats against the inner race of a ball bearing 94 which is press-fitted on the cylindrical portion 67ᶜ of operating shaft 67. The outer race of bearing 94 is press-fitted to bracket 75, within a circular opening formed therein, and to the inner surface of an annular ring 95 which is welded to the lower surface of bracket 74 to afford added bearing surface. Bearing 94 is constrained against movement upwardly of bracket 75 and ring 95 by a plate secured to the upper surface of bracket 75, which plate has a clearance opening for shaft 67 and which overlies the outer race of bearing 94. A shoulder formed on shaft 67 at the point of merger of portion 67ᶜ with a cylindrical portion 67ᵈ, constrains bearing 94 against downward movement axially of shaft 67.

As best shown in Figs. 4, 7 and 8, ratchet wheel 92 is provided with a portion 92ᵇ which merges with and extends peripherally about the hub 92ᵃ. Portion 92ᵇ, which is preferably smaller in vertical dimension than the hub 92ᵃ, has 24 substantially V-shaped teeth 92ᶜ formed in its peripheral edge. The teeth 92ᶜ are slightly flattened at their outer ends, and are spaced from each other at equal radial angles of 15°. The cutaway portions between teeth 92ᶜ comprise complementally formed notches 92ᵈ. An elongated opening 92ᵉ is formed in portion 92ᵇ of wheel 92 and is so centered with respect to its longitudinal dimension that it extends equi-distant on opposite sides of a radial line running through the center of one of the teeth 92ᶜ.

A cylindrical pin 96, preferably having a diameter equal to one-half the longitudinal dimension of opening 92ᵉ in wheel 92, is rigidly secured to the wheel 84, and extends downwardly a right angle from the lower surface of the latter through the opening 92ᵉ in wheel 92. Pin 86 and opening 92ᵉ afford a lost motion driving connection between indexing wheel 84 and ratchet wheel 92.

As best shown in Figs. 4 and 7, a lever 97 is pivotally supported adjacent one end thereof on a bolt 98 which takes into a threaded recess formed in a cylindrical post 99. The post 99 is rigidly secured to the upper surface of a rectangular bracket 100, and said bracket is adjustably mounted on the upper surface of bracket 75 by means of bolts which penetrate elongated openings formed in bracket 100, adjacent the ends thereof, and which take into threaded openings in bracket 75. A member 101 is rigidly secured to lever 97 adjacent the other end of the latter and projects outwardly therebeyond. Member 101 is provided with a threaded opening extending transversely therethrough adjacent its free end and a threaded actuating member 102 is adjustably accommodated within said opening. Member 102 is provided with a hemispherically shaped head 102ᵃ and is retained in adjusted position with respect to member 101 by a lock nut taking up against the latter. Substantially midway between the ends of lever 97, a roller 103 is secured thereto by means of a pin 104 non-rotatably fixed to lever 97 and having an enlarged head overlying the upper surface of roller 103. Roller 103 is free to turn on pin 104 and is adapted to engage ratchet wheel 92 on the teeth 92ᶜ and within the notches 92ᵈ thereof. A tension spring 105, secured at one end to lever 97 and at its other end to a pin 106 rigidly secured to and projecting upwardly at a right angle from bracket 75, constantly biases lever 97 toward the periphery of ratchet wheel 92. Consequently, roller 103 is caused to alternately ride in the notches 92ᵈ and on the teeth 92ᶜ as ratchet wheel 92 is rotated, thereby causing lever 96 to oscillate about its pivot.

As best shown in Figs. 4 and 7, a relay CR, of the type shown and described in the Kuhn et al. Patent No. 2,284,621, issued June 2, 1942, is mounted on support 60 so that one limb of its armature CR¹ is in the path of the head 102ᵃ of member 102. The head 102ᵃ of member 102, upon oscillation of lever 97, is adapted to engage and move armature CR¹ of relay CR into the position it normally assumes by virtue of energization of its operating winding CR². Relay CR carries a set of normally open contacts CR³, a set of normally closed contacts CR⁴, and a bridging contactor CR⁵, which is common to both sets of stationary contacts and movable therebetween by the armature CR¹. As will be later more fully explained, contacts CR³ and CR⁴ of relay CR are connected in circuit in the control system of the controller driving motors 61 and their commutation is effected by electromagnetic operation of armature CR¹, afforded by energization of winding CR², and by mechanical operation, afforded by member 102.

Position lock 65 comprises the aforementioned plunger 85 having a roller 85ᵃ, a molded insulating supporting block 107, a magnet frame 108, a movable armature 109, a molded insulating block 110, movable by armature 109 and carrying a bridging contactor 111, a pair of molded insulating blocks 112, each of which is secured to magnet frame 108 on opposite sides of block 110, a pair of stationary contacts 113, each of which is secured to the end of a block 112 and adapted to be bridged by contactor 111, and an electromagnetic operating winding 114. Supporting block 107 has portions 107ᵃ and 107ᵇ, extending through a rectangular clearance opening 76ᵃ formed in bracket 76 and merging with a portion 107ᶜ which overlies and seats against the outer surface of bracket 76. Block 107 is rigidly secured to bracket 76, and in turn has rigidly secured thereto magnet frame 108. Magnet frame 108 has secured thereto, at its end adjacent block 107, channel-shaped guide members 115 which extend partially across the length of the magnet frame 108. Operating winding 114 is positioned about the guide 115, centrally between the opposite ends of magnet frame 108. Armature 109, which is adapted to reciprocably move in the guides 115, is a built up structure comprising legs 109ᵃ and 109ᵇ, spaced apart by a section of laminations of magnetic material 109ᶜ, and bushings 109ᵈ secured to the inner surfaces of legs 109ᵃ and 109ᵇ adjacent corresponding ends thereof. The legs 109ᵃ and 109ᵇ and bushings 109ᵈ of armature 109 have alined openings formed therein to accommodate a shaft 116, which extends through said armature. Rollers 117 are positioned on shaft 116 adjacent each end thereof, above and below the legs 109ᵃ and 109ᵇ of armature 109, and said rollers roll in guideways formed interiorly in the portions 107ᵃ and 107ᵇ of block 107.

Plunger 85 is provided with a molded insulating member 85ᵇ of forked form which comprises a reduced portion 85ᶜ. The portion 85ᶜ is provided with an opening to accommodate the shaft 116 which extends therethrough. Member 85ᵇ is provided with portions 85ᵈ and 85ᵉ integrally connected with the portion 85ᶜ. Portions 85ᵈ and 85ᵉ have alined openings extending therethrough to accommodate a shaft 118. The roller 85ᵃ is positioned with a free fit on the shaft 118, and roller 85ᵃ is adapted to freely rotate on shaft 118 within a notch between the portions 85ᵈ and 85ᵉ. Shaft 118, like shaft 116, is fitted with rollers 119 which are adapted to roll in the aforementioned guideways in portions 107ᵃ and 107ᵇ of block 107.

The legs 109ᵃ and 109ᵇ of armature 109 extend a considerable distance beyond the section 109ᶜ, straddle a portion 108ᵃ of magnet frame 108, and said legs are rigidly attached to block 110 immediately adjacent their ends.

The bridging contactor 111 is resiliently supported on block 110 and the contactor is adapted to bridge stationary contacts 113 when armature 109 is moved a predetermined distance towards the right, as viewed in Figs. 5 and 6. A pair of compression springs 120 positioned about guide pin 121, carried on end brackets of magnet frame 108, are adapted to bias the assembly comprising contactor 111, block 110 and armature 109 for movement towards the left, as viewed in Figs. 5 and 6.

When operating winding 114 is energized, armature 109 is caused to move towards the right, as viewed in Figs. 5 and 6, until the end of its section 109ᶜ engages and seals against the portion 108ᵃ of magnet frame 109. When armature 109 has reached this sealed position, the roller 85ᵃ has been fully withdrawn from engagement with indexing wheel 84 and the contactor 111 is in engagement with the stationary contacts 113. When roller 85ᵃ is free of wheel 84, the latter is free to rotate under the drive of motor 61 through the aforementioned slip-clutch driving connection. Upon deenergization of operating winding 114, armature 109 tends to move towards the left under the bias of springs 120. As will be hereinafter more fully explained in connection with the control system for motor 61, winding 114 is always deenergized at such time, upon initiation of stopping action, that roller 85ᵃ of plunger 85 always drops on the end of tooth 84ᵇ of wheel 84 and rides into an immediately adjacent slot 84ᵃ, thereby locking wheel 84 against further rotation. The contacts 113 are connected in circuit in the control system for motor 61 and the purpose and effect of their commutation will be hereinafter explained.

*Vernier switch drum*

A preferred form for vernier switch drum 66 is shown in Figs. 4, 8 and 9.

Switch drum 66 comprises eighteen plunger operated electric switch units 125 which are adapted to be operated by cams 126 carried on operating shaft 67. Switch units 125 are carried and supported in pairs in blocks 127 formed of molded electrical insulating material. Three switch blocks 127, carrying a total of six of the switch units 125, are arranged in a vertical row, and three such vertical rows of switch blocks 126, designated I, II and III are spaced at rotary angles of 90° about operating shaft 67.

Operating shaft 67 is provided with a portion 67ᶠ which is square in horizontal cross section as shown in Fig. 9. The portion 67ᶠ of shaft 67 extends beyond the upper and lower limits of the vertical rows of switch blocks I, II and III. As best shown in Fig. 8, shaft 67 extends through and below an L-shaped bracket 128 which is rigidly secured to support 60 and which extends in parallel relation to brackets 74 and 75. A ball bearing 129 has its inner race press-fitted to the portion 67ᵍ of shaft 67 and its outer race is pressfitted to bracket 128, within an opening formed in the latter, and to the inner surface of a ring which is welded to the upper surface of bracket 128 to afford additional bearing surface. Shaft 67 and ball bearing 129 are constrained against downward movement with respect to bracket 128 by a plate 130 secured to the bottom surface of bracket 128 and having a clearance opening therein for shaft 67.

The switch carrying blocks 127 are formed in one-piece and on their outer faces are provided with upper and lower, front opening recesses 127ª and 127ᵇ, alike in form, and another front opening recess 127ᶜ lying between the recesses 127ª and 127ᵇ. The recess 127ᶜ is separated from recesses 127ª and 127ᵇ by horizontal barrier portions 127ᵈ and 127ᵉ. Recess 127ª is closed at its upper side by an extension of the top end portion 127ᶠ of block 127 and recess 127ᵇ is closed at its bottom side by an extension of the bottom end portion 127ᵍ of said block. The blocks 127 are supported in the vertical rows on pairs of supporting shafts 131, which are rigidly secured at their upper and lower ends to brackets 75 and 128, by screws which penetrate screw receiving openings, communicating with recess 127ᶜ, and take into threaded openings in said shafts; the inner faces of the blocks being suitably formed so that they overlie and clamp against the shafts 131.

As best shown in Figs. 8 and 9, the blocks 127 are provided with a portion 127ʰ which extends beyond the shafts 131 toward operating shaft 67. The portion 127ʰ is provided with a pair of openings 127ʲ extending therethrough and communicating with the recesses 127ª and 127ᵇ, respectively. A one-piece, molded insulating plunger 132 is positioned within each of the openings 127ʲ and extends within the recesses 127ª and 127ᵇ. Plungers 132 are each provided with a rectangular shoulder 132ª which is adapted to engage with a ledge portion of the bottom wall of the recesses 127ª and 127ᵇ overhanging the openings 127ʲ and limit the movement of the plungers in one direction. Adjacent one end, the plungers 132 are provided with cylindrical portions 132ᵇ on which are adapted to loosely fit bridging contactors 133; the latter being provided with central clearance opening extending through a flanged portion 133ª. Contactors 133 are provided with lugs 133ᵇ depending on opposite sides thereof, which are accommodated within guideways formed in the portions 127ᵈ, 127ᵉ, 127ᶠ and 127ᵍ, as the case may be, thereby being constrained against endwise movement within the recesses 127ª and 127ᵇ.

The bridging contactors 133 are adapted to engage with pairs of stationary contacts 134 mounted on opposite sides of each of the openings 127ʲ and seating against the bottom walls of the recesses 127ª and 127ᵇ. Each of the contacts 134 is secured to block 127 together with a terminal member 135. As best shown in Fig. 9, certain of the terminal members 135 are bent at a right angle so as to insure against interference with the terminal members carried on blocks in the adjacent vertical rows.

Compression springs 136 are associated with each of the contactors 133 and at one end abut against the latter about the flanges 133ª. At their other ends the springs 136 abut against lugs 127ᵏ which are integrally formed with end portions 127ᶠ and 127ᵍ, and barriers 127ᵈ and 127ᵉ of block 127, and which extend partially over the front ends of recesses 127ª and 127ᵇ. The ends of the lugs 127ᵏ are of "hook" form and overlie the endmost coils of springs 136 to constrain them against lateral displacement.

As best shown in Fig. 8, plungers 132 at their other ends are of forked form and the end portions 132ᶜ and 132ᵈ thereof are provided with alined openings extending therethrough to accommodate shafts 137 with a free fit. Shafts 137, which extend above and below portions 132ᶜ and 132ᵈ, respectively, have loosely fitted thereon, adjacent each of their ends, rollers 138. Rollers 138 are adapted to roll in guideways formed in the blocks 127, and are adapted to afford movement of the plungers 132 within blocks 127 with a minimum of frictional resistance.

A roller follower 139 is loosely fitted to the shafts 138 within the notch between portions 132ᶜ and 132ᵈ of plunger 132 and is adapted to engage with the cam surface of a cam 126 carried on operating shaft 67.

There are six of the cams 126 non-rotatably secured to the portion 67ᶠ of shaft 67 and are so spaced thereon that the cam surface of each cam engages with the roller followers 139 of three switch units 125 lying in a common tier about the shaft 67. As best shown in Fig. 9, each of the cams 126 is built up of complementally half sections 126ª and 126ᵇ bolted together on the portion 67ᶠ of shaft 67. A continuous cam surface comprising high and low portions 126ᶜ and 126ᵈ, respectively, are provided on the sections 126ª and 126ᵇ on which the roller followers 139 of the switch units 125 ride. When the shaft 67 is rotated, and any of the roller followers 139 ride up on the high portions 126ᶜ, the plungers 132 and bridging contactors 133 are moved against the bias of the springs 136 to effect disengagement of contactors 133 from their associated pairs of stationary contacts 134. The springs 136 normally bias plungers 132 and contactors 133 for movement in a direction effecting engagement of the latter with their associated stationary contacts whenever its associated roller follower 139 rides on the low portion 126ᵈ of a cam 126.

It is a feature of the construction of switch units 125 and their supporting blocks 127, that the contactors 133 and stationary contacts 134 may be readily removed and replaced without need for removal of the switch blocks from the supporting shafts 30. Access is had through the front ends of recesses 127ª and 127ᵇ to compression springs 136 (see Figs. 4 and 9) and the latter may be readily removed by compressing them clear of engagement with the lugs 127ᵏ and withdrawing the same sideways of the latter. Contactor 133 may then be slipped off the portion 132ᵇ of plunger 132, tipped on its side so that its lugs 132ᵇ are disengaged from their guideways in blocks 127 and then withdrawn. With contactors 133 removed, it will be apparent that stationary contacts 134 and terminal members 135 can be readily removed and replaced.

In order to disassemble a plunger 132 from a switch block 127, it is required that the latter be removed from the supporting shafts 130. Then, assuming that the spring 136 and contactor 133 associated therewith has first been removed, a plunger 132 can be withdrawn by slightly tipping it to one side of the opening 127ʲ so that its shoulder 132ª clears the ledge overhanging said opening and pulling it clear of the block.

Main switch drum

A preferred form for main switch drum 69 is shown in Figs. 10, 12 and 13.

Main switch drum 69 comprises sixteen plunger operated switch units, which are exactly like the switch units 125 of vernier switch drum 66, and which are operated by cams, like cams 126 of vernier switch drum 66, carried on operating shaft 70. The switch units of drum 69, like the switch units 125, are carried and supported in one-piece molded insulating blocks 127. Eight blocks 127 are arranged in two vertical rows of four blocks, designated IV and V, on opposite sides of operating shaft 70. The switch blocks 127 of each row are mounted on pairs of supporting shafts 145 and secured to pairs of supporting shafts 145 which are rigidly secured at their upper and lower ends to L-shaped brackets 146 and 147. Brackets 146 and 147 are rigidly secured to support 60 and extend in parallel relation to brackets 74, 75 and 128.

Operating shaft 70 is provided with a portion 70ª, of square horizontal cross section, which extends beyond the upper and lower limits of the vertical rows of switch blocks IV and V. Eight of the cams 126 are mounted on the portion 70ª of shaft 70 and are spaced therein so each such cam is engaged on its cam surface with the roller followers 139 of two switch units 125 forming a common horizontal tier of switch units.

Operating shaft 70 is afforded rotational bearing support in brackets 146 and 147 by ball bearings 148 and 149, respectively, which are press-fitted to cylindrical portions of shaft 70 and to said brackets; the manner of the mounting being substantially the same as hereinbefore described in connection with operating shaft 67 of vernier switch drum 66.

As best shown in Figs. 10 and 13, upstanding posts 150 and 151 are rigidly secured to the upper surface of bracket 147. Posts 150 and 151 are provided with threaded openings extending therethrough adjacent their upper ends and bolts 152 threadedly engage with the posts therewithin. Bolts 152 are locked in adjusted position in said posts by nuts taking up against lock washers bearing against the posts. A pin 153, rigidly secured to the portion 70ª of operating shaft 70 and projecting at a right angle therefrom in a line with the heads of the bolts 152, is adapted to engage with the heads of either of bolts 152 when shaft 70 is rotated to limit the angular rotation of the latter to a part of a single revolution. In the preferred embodiment of the controller, the posts are so placed and the bolts 152 so adjusted that the angular rotation of shaft 70 is limited to 135°.

*Interlock switch drum*

A preferred form for interlock switch drum 71 is shown in Figs. 10, 14, 15, 16, 17 and 18.

Interlock switch drum 71 is afforded support on the brackets 146 and 147 of main switch drum 69. As best shown in Fig. 10, angle brackets 155 and 156 are welded to the upper and lower surfaces of brackets 146 and 147, respectively, and brackets 155 and 156 have rigidly secured thereto L-shaped brackets 157 and 158, respectively.

Operating shaft 72 is supported in brackets 157 and 158 on ball bearings (not shown) in a manner similar to that hereinbefore described in connection with operating shaft 67 of vernier switch drum 66. Annular rings 159 are welded to the lower and upper surfaces of brackets 147 and 148, respectively, to afford added bearing surface for the last mentioned ball bearings. Shaft 72 and these ball bearings are constrained against movement upwardly or downwardly relative to brackets 157 and 158 by plates 160 secured to the upper and lower surfaces of brackets 157 and 158, respectively.

Drum 71 comprises a plurality of plunger operated switch units 161, similar in construction and arrangement to those disclosed in Patent No. 2,521,519 granted September 5, 1950, to Richard B. Hunter and Harold L. Mekelburg. Switch units 161 are enclosed and supported in vertically alined groups of three in pairs of interfitting, molded insulating blocks 162 and 163 which are similar in general arrangement and construction to corresponding switch supporting blocks shown in the aforementioned Hunter et al. patent. Each of the switch units 161 is biased to circuit-closed position and has a plunger actuator 161ª with a roller follower 161ᵇ attached to the end thereof. A plurality of the interfitting switch blocks 162 and 163 are supported in a vertical row on a pair of supporting shafts 164 which are rigidly secured at their top and bottom ends to brackets 157 and 158, respectively.

Each of the roller followers 161ᵇ of the switch units 161 has associated therewith an operating cam 165. The cams 165 are carried on a shaft 166 which is non-rotatably secured to the brackets 157 and 158. Each of the cams 165 is secured, as by welding, to a hub portion 167ª of a gear 167 which extends through a clearance opening in the cam. The assembly comprising a cam 165 and a gear 167 is rotatably mounted on a flanged bushing 168 which in turn is rotatably mounted on shaft 166. The upper ends of each of the bushings 168 seats against the lower surface of a gear 167 and serve to space adjacent cam and gear assemblies from each other on shaft 166. Spacing collars and shims are positioned on shaft 166 above the uppermost bushing 168 and the lowermost gear 167 to space the plurality of cam, gear and bushing assemblies properly between the brackets 157 and 158.

The gears 167 are a special form of twelve tooth gear having four teeth 167ᵇ extending across the full width of the gear and spaced at rotary angles of 90° about the periphery of the gear, and have eight teeth 167ᶜ extending from one face of the gear only part way across the width thereof. A pair of the teeth 167ᶜ are interposed between any two of the full-length teeth 167ᵇ. The teeth 167ᵇ and 167ᶜ have the same profile and are equally spaced about the periphery of gear 166. Four arcuate concaved depressions 167ᵈ are formed in the hub portion 167ª adjacent the ends of the pairs of teeth 167ᶜ.

An assembly comprising a laminated two-toothed gear sector 169 and a notched circular disc 170 cooperate to afford intermittent drive and locking of each of the gears 167. Gear sector 169 comprises teeth 169ª and 169ᵇ which are integrally formed with a bracket portion 169ᶜ. Sector 169 is rigidly secured to the disc 170 so that the notch between the teeth of the former alines with a correspondingly formed notch 170ª in the latter. The pitch radius of the combination of sector 169 and disc 170 is preferably in a ratio of 4:1 with respect to that of gear 167. Disc 170 is provided with a central clearance opening 170ᵇ for shaft 72 and is also provided with an elongated arcuate opening 170ᶜ. Opening 170ᶜ is preferably formed in respect of its arcuate longitudinal dimension so that radial lines intersecting the ends of said openings are spaced at an angle of 30°. Disc 170 is adjustably, non-rotatably secured to a disc 171 by means of a bolt 172 penetrating opening 170ᶜ and taking into one of twelve threaded openings 171ª formed in disc 171. Disc 171 is preferably smaller in outer diameter than disc 170 and is provided with a square central opening to receive the corresponding square portion 72ª of operating shaft 72, thereby insuring non-rotatable securement of said disc on shaft 72. The openings 171ª are preferably spaced at equal radial angles of 30° and lie adjacent the periphery of disc 171.

The assemblies comprising gear sector 169, disc 170 and disc 171 are spaced from the other such assemblies on the portion 72ª of shaft 72 by annular spacing collars 173 positioned on said shaft. The plurality of such assemblies are spaced appropriately at the upper end thereof from bracket 157 by a spacing collar 174 and a spacing collar 175 which is secured to shaft 72 by a rivet 176 penetrating the latter collar and shaft 72. At their lower end, the plurality of the assemblies are adjustable with respect to their spacing relative to bracket 158 by means of a nut 177 threadedly engaging a threaded portion 72ᵇ on operating shaft 72.

Operating shaft 72 extends upwardly beyond the upper surface of bracket 158 and adjacent its upper end is provided with a portion (not shown) which is square in horizontal cross section. A gear 178 having a hub portion 178ª, with a correspondingly square opening formed therein to accommodate the last mentioned portion of shaft 72, is secured to shaft 72 by means of a bolt 179 taking into a threaded recess formed in the upper end of the shaft. A circular indicia plate 180 is riveted to the upper surface of gear 178 and is provided with ninety-six equally spaced marks. Every fifth mark is preferably numerically indicated starting from zero (0). A stationary position indicator 181, having a pointed end overlying the edge of plate 180, is rigidly secured to bracket 157.

The cam surfaces of the cams 165 are provided with a "high" portion 165ª extending peripherally for 168° and with a "low" portion 165ᵇ extending peripherally for the same number of degrees. The transition from the "high" to the "low" portions of the cams is provided by portions 165ᶜ which extend peripherally for 12° therebetween.

Referring to Fig. 16, it depicts the operating condition of the interlock drum just prior to commencement of drive of one of the cams 165 for effecting commutation of its associated switch unit 161. Let it be assumed that shaft 72 is being driven in the clockwise direction. Tooth 169ª of gear sector 169 has just engaged with a tooth of gear 167 and upon continued rotation of shaft 72, gear 167 and cam 165 will be driven anticlockwise a total rotary angle of 90°, during which time the roller follower 161ᵇ of an associated plunger 161ª will ride up from the lower portion 165ᵇ, on portion 165ᶜ, onto the high portion 165ª of the cam surface, thereby effecting opening of the contacts in a switch unit 161. Fig. 17 depicts an intermediate point in the rotation of cam 165 where the roller follower 161ᵇ has just ridden up onto the portion 165ª of cam 165; cam 165 having been driven a rotary angle of 60° from the position depicted in Fig. 16. Cam 165 will then continue to rotate another 30° before completion of its movement in the anticlockwise direction; roller follower 161ᵇ riding farther onto the portion 165ª a corresponding amount, as shown in Fig. 18. Drive of cam 165 anticlockwise through a rotary angle of 90° is completed when the tooth 169ᵇ just disengages from gear 167, and thereafter gear 167 and cam 165 are locked against further rotation by the periphery of disc 170 projecting within a depression 167ᵈ of gear 167.

It will be apparent that upon rotation of shaft 72 in the anticlockwise direction, the starting condition of drive of cam 165 in the clockwise direction will be depicted by Fig. 18, an intermediate condition just prior to operation of switch unit 161 to effect closure of its contacts will be depicted by Fig. 17, and the condition at the completion of rotation of cam 165, wherein it is again locked, will be depicted by Fig. 16. The arrangement permits operation of each of the switch units 161 once in each revolution of shaft 72, either in the clockwise or anticlockwise direction.

Operation of the switch units 161 by a cam 165 may be adjusted to occur between any two of ninety-four positions in the rotation of shaft 72, as indicated upon indicia plate 180. For example, suppose it is desired that closure of the switch unit shown in Fig. 16 be effected between positions "91" and "90" when shaft 72 is driven anticlockwise. Shaft 72 is first rotated until the mark "91" on indicia plate 180 alines with the end of indicator 181. Then bolt 172 is loosened and withdrawn from disc 171, through opening 170ᶜ in disc 170, and the assembly comprising disc 170 and gear sector 169 is shifted relative to disc 171 so that the intermediate operating condition depicted in Fig. 17 is effected. Bolt 172 is then reinserted through opening 170ᶜ and taken down into an opening 171ª in disc 171 which alines with opening 170ᶜ. Thereafter operation of the switch unit from open to closed condition of its contacts will be afforded whenever shaft 72 in rotating anticlockwise moves from position "91" to position "90," and conversely the contacts of the switch unit will be operated from closed to open condition whenever shaft 72 rotating clockwise moves from position "90" to position "91."

It will be appreciated that anyone of the switch units 161 may be adjusted with respect to its point of operation in the rotation of shaft 72 by following the procedure outlined above.

The switch units 161 can only be adjusted for operation between any two of ninety-four positions in the rotation of shaft 72 due to the fact that the latter is limited to angular rotation of 348¾°, as will be hereinafter more fully explained. If shaft 72 were able to make a complete revolution, then operation of the switch units 161 could be adjusted to occur between any two of the ninety-six operating positions depicted on indicia plate 180, drum 71 being inherently capable thereof.

It is preferred that the operation of one of the switch units 161 be adjusted for opening its contacts when shaft 72 rotates clockwise from position "93" to "94" and that operation of another of said switch units be adjusted for opening its contacts when shaft 72 rotates anticlockwise from position "1" to "0". These latter switches are connected in circuit with the control system for driving motor 61 and function as limit switches, as will be hereinafter described.

Drive gearing

A preferred form for the drive gearing 68 for operating shafts 70 and 72 of main switch drum 69 and interlock switch drum 71, respectively, is shown in Figs. 8, 10, 11, 12 and 15.

Operating shaft 67 of vernier switch drum 66 has a portion 67ʰ of square horizontal cross section, extending a substantial distance below the lower surface of bracket 128. An assembly comprising a notched circular disc 185, a two-tooth gear sector 186 non-rotatably secured to disc 185, and a gear 187 are carried on the portion 67$^h$ of shaft 67 and are constrained against downward movement with respect thereto by a bolt 188 which takes into a threaded recess in the lower end of said shaft.

Gear 187 affords drive of gear 178 on shaft 72 of interlock switch drum 71 in the same direction through an idler gear 189. Idler gear 189 is freely rotatable and supported on a stub shaft 190 which is non-rotatably secured to bracket 128. Shaft 190 is drilled transversely adjacent its free end to accommodate a cotter key which together with a washer serves to hold gear 189 on said shaft in meshing engagement with gears 177 and 187. Preferably, the ratio of the pitch radii of gears 187, 189 and 177 is 1:2:4, thereby affording drive of shaft 72 at one-quarter the angular velocity of shaft 67 of vernier switch drum 66.

A special form of gear member 191 is freely rotatable on a shaft 192 which extends through and between brackets 128 and 146. Brackets 128 and 146 are provided with alined clearance openings to freely accommodate shaft 192 and have annular bushings secured to their lower and upper surfaces, respectively, to afford additional bearing surface for shaft 192 and constrain gear member 191 against any substantial movement axially of shaft 192. Shaft 192 is secured against movement relative to brackets 128 and 146 by cotter keys carried in transverse openings adjacent the upper and lower ends of the shaft.

Adjacent its upper end, gear member 191 is provided with an eight tooth gear 193 having four teeth 193$^a$, extending the full width of the gear, and four teeth 193$^b$, extending part way across the width of the gear from the lower face thereof. The teeth 193$^a$ and 193$^b$ have the same profile and are equally spaced about the periphery of gear 193 in alternate arrangement. The assembly comprising disc 185 and gear sector 186 is adapted to effect intermittent drive and locking of gear 193; the type of drive being substantially the same as that aforedescribed in connection with the gears 167, gear sector 169, and the notched disc 170 of interlock switch drum 71. In the present instance the ratio of pitch radii between the assembly comprising disc 185 and gear sector 186, and, gear 193 is 2:1. Thus gear sector 186 and disc 185, once in each revolution of shaft 67, afford drive of gear 193 through a total rotary angle of 90° and between times affords locking of this gear against rotation.

Adjacent its lower end gear member 191 is provided with an idler gear 194 meshing with a gear 195 carried on shaft 70 of main switch drum 69. The gears 193 and 194 of member 191 are integrally connected by a cylindrical hub portion 196 and a central clearance opening for shaft 192 extends through gears 193 and 194 and portion 196. The ratio of the pitch radii of idler gear 194 and gear 195 is 1:2. Gear 195 is non-rotatably secured to shaft 70 and is constrained against movement axially thereof by a bolt 197 taking into a threaded recess formed in the end of shaft 70.

It will be apparent that gear member 191 will be driven a total rotary angle of 90° each revolution of shaft 67, in the reverse direction, and that shaft 70 is thus driven a total rotary angle of 45°, in the same direction as shaft 67 once during each revolution of the latter. As afore-indicated, shaft 70 is limited to 135° of rotary movement. When the pin 153 on shaft 70 engages either of the heads of bolts 152 carried in the posts 150 and 151 in main switch drum 69, further rotation of shaft 70 is prevented. Shaft 67 of vernier switch drum 66, however, is free to rotate another 315° before the gear sector 186 and disc 185 again come into position to drive gear 193. As shaft 70 cannot rotate, gear member 191 is consequently locked against further rotation, and further rotation of shaft 67 is accordingly prevented. As shaft 72 of interlock switch drum 71 derives its drive from shaft 67, it is likewise incapable of further rotation.

*Control system for the controller driving motor*

A preferred control system for driving motor 61 is diagrammatically depicted in Fig. 19.

As aforeindicated, driving motor 61 in a preferred form is a split field, single phase alternating current motor. As shown in Fig. 19, the fields of motor 61 are designated 61$^a$ and 61$^b$. Motor 61 is connected at one side to supply line L$^1$ of a single phase alternating current supply source and its field 61$^a$ is connectable to line L$^2$ of said source by closure of normally open contacts 200$^a$ of an electromagnetic contactor 200, which has an operating winding 200$^b$ and two other pairs of normally open contacts 200$^c$ and 200$^d$. Field winding 61$^b$ is connectable to line L$^2$ by closure of normally open contacts 201$^a$ of an electromagnetic contactor 201 which has an operating winding 201$^b$ and two other pairs of normally open contacts 201$^c$ and 201$^d$.

An electromagnetic relay 202 has an operating winding 202$^a$ which is in circuit across lines L$^1$ and L$^2$ in series with the normally open contacts of a momentary type of push-button switch 203, the normally closed contacts 204$^a$ of an electromagnetic relay 204 and a limit switch 205; limit switch 205 being that one of the switch units 161 of interlock switch drum 71 set for opening of its contacts when shaft 72 reaches the limit of its rotation in the clockwise direction as viewed in Fig. 16. Relay 202 is provided with normally open contacts 202$^b$ and 202$^c$ and with normally closed contacts 202$^d$ and 202$^e$. Relay 204 is provided with an operating winding 204$^b$, an additional pair of normally closed contacts 204$^c$ and normally open contacts 204$^d$ and 204$^e$.

Winding 200$^b$ of contactor 200 is connectable to supply line L$^1$ through contacts 202$^b$ of relay 202, and also through contacts 113 of position lock 65 and contacts 200$^c$ of contactor 200. Winding 200$^b$ is connectable to line L$^2$ through contacts 204$^a$ of relay 204 and limit switch 205.

Operating winding 204$^b$ of relay 204 is connectable across lines L$^1$ and L$^2$ in series with the normally open contacts of a push-button switch 206 (like switch 203), contacts 202$^d$ of relay 202 and a limit switch 207; limit switch 207 being that one of the switch units 161 of interlock switch drum 71 set for opening of its contacts when shaft 72 reaches the limit of its rotation in the anticlockwise direction as viewed in Fig. 16. Operating winding 201$^b$ of contactor 201 is connectable to line L$^1$ through contacts 204$^d$ of relay 204, and also through contacts 113 of position lock 65 and contacts 201$^c$ of contactor 201. Operating winding 201$^b$ is connectable to line L$^2$ through contacts 202$^d$ of relay 202 and limit switch 207.

Operating winding 114 of position lock 65 is connectable to line L$^1$ either through contacts 202$^c$ of relay 202, through contacts 204$^e$ of relay 204, or through normally closed contacts CR⁴ of relay CR. Winding 114 is connectable at its other end to line L² either through contacts 200ᵈ of contactor 200 or through contacts 201ᵈ of contactor 201.

The operating winding CR² of relay CR is connectable to line L¹ in series with normally open contacts CR³ of said relay, contacts 202ᵉ of relay 202 and contacts 204ᶜ of relay 204. At its other end winding CR² is connectable to line L², either through contacts 200ᵈ of contactor 202 or contacts 201ᵈ of contactor 201.

In the condition of the control system depicted in Fig. 19 it may be assumed that the controller is in one extreme operating position following drive of shafts 67, 70 and 72 of vernier, main and interlock switch drums 66, 69 and 71, respectively, to their respective limits in the anticlockwise direction as viewed in Figs. 9, 12 and 18. Let it be assumed that it is desired to operate the controller in the "forward" direction corresponding to clockwise rotation of shafts 67, 70 and 72. Operation of the controller in the "forward" direction is initiated by closure of switch 203 which completes the connection for energization of winding 202ᵃ of relay 202. As a result of energization of winding 202ᵃ contacts 202ᵇ and 202ᶜ close, while contacts 202ᵈ and 202ᵉ open. Closure of contacts 202ᵇ completes the circuit for energization of winding 200ᵇ of contactor 200, and contacts 200ᵃ of the latter thereupon close, completing the energizing circuit for motor 61 through its field winding 61ᵃ. Closure of contacts 202ᶜ of relay 202 completes an energizing circuit for operating winding 114 through the then closed contacts 200ᵈ of contactor 200.

Energization of winding 114 of position lock 65, as aforeindicated, effects withdrawal of the roller follower 85ᵃ of plunger 85 out of locking relation with position indexing wheel 84, and thereafter shaft 67 is driven in the "forward" direction by motor 61 through speed reducing gearing 63 and the aforedescribed slip-clutch driving connection. So long as switch 203 is maintained closed, the motor will continue to drive shaft 67 until the latter has completed 3⅞ revolutions in the "forward" direction. As aforeindicated, shaft 72 of interlock switch drum 71 is afforded drive concurrently with shaft 67 at one-quarter the angular velocity of the latter and will complete 348¾° of rotation in the "forward" direction during the interval when shaft 67 completes 3⅞ revolutions. Shaft 70, as aforeindicated, will be driven intermittently in the forward direction 45° during the time shaft 67 is completing at last 45° of each full revolution in the forward direction, and will rotate 135° to its "forward" limit at the completion of the third revolution of shaft 67. When shaft 67 has completed 3⅞ revolutions and shaft 72 has completed 348¾° of rotation in the forward direction, limit switch 205 opens effecting deenergization of winding 202ᵃ of relay 202 and winding 200ᵇ of contactor 200. Contacts 200ᵃ, 200ᶜ and 200ᵈ of contactor 200, open, thereby effecting disconnection of motor 61 from the supply source and deenergization of winding 114 of position lock 65. As aforeindicated, deenergization of winding 114 causes the roller follower 85ᵃ of plunger 85 to engage with indexing wheel 85, and in this instance when shaft 67 is driven to its "forward" limit, it will be projected directly into a notch 84ᵃ in wheel 84 for locking the controller in the "forward" limit operating position.

If it is desired to run the controller from this "forward" limit operating position, or any intermediate operating position between its "forward" and "reverse" limit operating positions, in the "reverse" direction corresponding to drive of shafts 67, 70 and 72 in the anticlockwise direction as viewed in Figs. 9, 12 and 18, such is initiated by closure of push-button switch 206. Closure of switch 206 completes the energizing circuit for winding 204ᵇ of relay 204 through the then closed contacts 202ᵈ of relay 202 and the then closed limit switch 207. Contacts 204ᵈ and 204ᵉ of relay 204 thereupon close. Closure of contacts 204ᵈ completes the energizing circuit for winding 201ᵇ of contactor 201 and the contacts 201ᵃ, 201ᶜ and 201ᵈ of the latter close. Closure of contacts 201ᵃ completes the energizing circuit for motor 61 through its field winding 61ᵇ. Closure of contacts 204ᵉ of relay 204 completes the energizing circuit for winding 114 of position lock 65 through the then closed contacts 201ᵈ of contactor 201. Roller follower 85ᵃ of plunger 85 is thereupon withdrawn from locking engagement with indexing wheel 84, and motor 61 thereafter drives shafts 67, 70 and 72 in the "reverse" direction. If switch 206 is maintained closed until shafts 67, 70 and 72 have completed 3⅞ revolutions, 135° of rotation, and 348¾° of rotation, respectively, limit switch 207 will open, thereby affording deenergization of winding 204ᵇ of relay 204 and winding 201ᵇ of contactor 201. Contacts 201ᵃ, 201ᶜ and 201ᵈ of contactor 201 thereupon open, effecting disconnection of motor 61 from the supply source and deenergization of winding 114 of position lock 65. Roller follower 85ᵃ of plunger 85 thereupon engages indexing wheel 84 within a slot 84ᵃ thereof to lock the controller in the "reverse" limit operating position.

The controller of course can be run and stopped in any one of the intermediate operating positions between the aforementioned "forward" and "reverse" limit operating positions. Assume, for example, that the controller is running in the "forward" direction and switch 203 is released when the controller is in some intermediate position. As aforeindicated, opening of switch 203 causes deenergization of winding 202ᵃ of relay 202 and contacts 202ᵇ and 202ᶜ of the latter will immediately open. Winding 200ᵇ of contactor 200 may or may not be deenergized immediately as a result of opening of switch 203. It will be apparent that winding 200ᵇ has another connection to line L¹ through the then closed contacts 113 of position lock 65 and is required that the latter contacts open before winding 200ᵇ can be deenergized. Opening of contacts 113 is dependent upon deenergization of winding 114 of position lock 65. Winding 114 may or may not be deenergized by the opening of contacts 202ᶜ of relay 202, depending upon whether the contacts CR⁴ of relay CR are then open or closed. As aforeindicated, relay CR is afforded intermittent mechanical operation by the oscillation of lever 97 effected by the roller 103 thereof riding alternately on the teeth 92ᶜ and in the notches 92ᵈ of ratchet wheel 92 when wheel 84 and shaft 67 are rotating.

If at the instant switch 203 is opened roller 103 of lever 97 is riding on the end of a tooth 92ᶜ of ratchet wheel 92, contacts CR³ of relay CR will be closed and contacts CR⁴ will be opened. Closure of contacts CR³ will complete an energizing circuit for winding CR² of relay CR through the then closed contacts 202ᵉ and 204ᵉ of relays 202 and 204, respectively, and through the then closed contacts 200ᵈ of contactor 200. Consequently, winding 114 of position lock 65 will be deenergized with the result that the roller follower 85ᵃ of plunger 85 immediately moves into engagement with the end of a tooth 84ᵇ of indexing wheel 84. Contacts 113 of position lock 65 do not, however, immediately open as they are so adjusted that they remain closed while the roller follower 85ᵃ of plunger 85 is engaged with the end of a tooth 84ᵇ of indexing wheel 84 and open when roller follower 85ᵃ drops into a slot 84ᵃ of indexing wheel 84 to lock the controller against further rotation of its operating shafts. This insures that winding 200ᵇ of contactor 200 will be maintained energized so that motor 61 will continue to drive the controller operating shafts and indexing wheel 84 until roller follower 85ᵃ engages within a slot 84ᵃ of indexing wheel 84. Any driving torque occurring after indexing wheel 84 is locked will be absorbed by slippage between friction disc 83 and indexing wheel 84 of the aforementioned slip-clutch driving connection.

The assumed positioning of roller 103 of lever 97 on the end of a tooth 92ᶜ of ratchet wheel 92 occurs whenever a tooth 84ᵇ of indexing wheel 84 is in line with the roller follower 85ᵃ of plunger 85. If lever 97 is properly adjusted in position on bracket 75, the aforementioned lost motion driving connection between indexing wheel 84 and ratchet wheel 92 will insure these relationships regardless of the direction of rotation of wheel 84. As aforeindicated, the supporting bracket 100 for lever 97 may be adjusted in position transversely on bracket 75 and facilitates obtaining the aforementioned desired relationship.

If at the instant switch 203 is opened a slot 84ᵃ of wheel 84 is in line with roller follower 85ᵃ of plunger 85, winding 114 will not be immediately deenergized to permit engagement of roller follower 85ᵃ in that particular notch for immediate locking of the controller. In such condition of alinement of roller follower 85ᵃ and wheel 84, the roller 103 of lever 97 will be riding in a notch 92ᵈ on ratchet wheel 92, and consequently, contacts CR³ of relay CR will be open and contacts CR⁴ will be closed. Thus, regardless of the opening of contacts 202ᶜ due to deenergization of winding 202ᵃ of relay 202, winding 114 will be maintained energized, thereby maintaining contacts 113 closed and plunger 85 retracted pending a subsequent mechanical operation of relay CR afforded by roller 103 of lever 97 riding onto the end of a tooth 92ᶜ of ratchet wheel 92. Wheel 84 and shaft 67 will thus continue to be driven by motor 61 until such mechanical operation of relay CR occurs. Thereafter, roller follower 85ᵃ will engage with the end next adjacent tooth 84ᵇ of wheel 84 and ride, by drive of wheel 84 by motor 64, into the next succeeding slot 84ᵃ of wheel 84 to lock the controller, and motor 61 will thereafter be deenergized.

Whereas it has been assumed that the controller was running in the "forward" direction in describing the behavior of the controller and the control system for its driving motor 61, following initiation of stopping action in intermediate operating positions, it will be appreciated that similar action will be afforded upon initiation of stopping action when the controller is running in the "reverse" direction in intermediate operating positions.

In view of the foregoing, it will be appreciated that upon initiation of stopping action of the controller in intermediate operating positions, the roller follower 85ᵃ of plunger 85, upon release of the latter, will always first engage with the end of a tooth 84ᵃ of wheel 85 and ride into the next succeeding slot 84ᵃ of the latter before locking of the controller is effected. This insures that the controller will be locked in definite operating positions so that the contacts of the respective switch units carried in the vernier, main and interlock switch drums 66, 69 and 71 will be fully open or fully closed as the case may be.

It will be appreciated from the foregoing that an operator can obtain step-by-step operation of the controller by momentarily closing either of the push-button switches 203 and 206, or can operate the controller to any operating position by holding the proper push-button switch closed until the desired controller position is reached.

I claim:

1. In combination, a switching controller having a rotatable operating shaft, an electric motor, driving connections between said motor and said shaft, an element on said shaft having means defining for said shaft a plurality of definite, rotary spaced operating positions, a reciprocably movable member biased for movement into engagement with said element and in cooperation with said means affording locking of said shaft in any one of its operating positions, electroresponsive means energizable to move said member out of engagement with said element, and means for controlling the energization and deenergization of said motor and said electroresponsive means comprising means acting to insure deenergization of said electroresponsive means and locking of said shaft in a definite operating position prior to deenergization of said motor.

2. In combination, a switching controller having a rotatable operating shaft, an electric motor, driving connections between said motor and said shaft, an element on said shaft having means defining for said shaft a plurality of definite, rotary spaced operating positions, a reciprocably movable member biased for movement into engagement with said element and in cooperation with said means affording locking of said shaft in any one of its operating positions, electroresponsive means energizable to move said member out of engagement with said element, and means for controlling the energization and deenergization of said motor and said electroresponsive means comprising means operable to energize and initiate deenergization of said motor and said electroresponsive means and coordinated means responsive to position of said shaft and said member to insure deenergization of said electroresponsive means and locking of said shaft in a definite operating position prior to deenergization of said motor.

3. In combination, a switching controller having a rotatable operating shaft, an electric motor, driving connections between said motor and said shaft, an element on said shaft having means defining for said shaft a plurality of definite, rotary spaced operating positions, a reciprocably movable member biased for movement into engagement with said element and in cooperation with said means affording locking of said shaft in any one of its operating positions, electroresponsive means energizable to move said member out of engagement with said element, and means for controlling the energization and deenergization of said motor and said electroresponsive means comprising means manually operable to energize and initiate deenergization of said motor and said electroresponsive means, a switch operable by movement of said member, a second switch and means for operating said second switch each time said shaft advances in its rotation an angular distance corresponding to that between adjacent operating positions, said electroresponsive means being deenergized following the last mentioned operation of said manually operable means as a result of an operation of said second switch, and said motor thereafter being deenergized as a result of operation of the first mentioned switch resulting from movement of said member into locking relation with said element.

4. In combination, a switching controller having a rotatable operating shaft, an electric motor, driving connections between said motor and said shaft, a wheel fixed to said shaft and having means defining for said shaft a plurality of definite, rotary spaced operating positions, an electromagnetically controlled member biased for movement into engagement with said wheel and affording in cooperation with said means locking of said shaft in any one of its operating positions, a switch biased to a given position and movable to another as a result of movement out of engagement with said wheel, a second switch biased to one position, means for operating said second switch to a second position each time said shaft advances in its rotation an angular distance corresponding to that between adjacent operating positions, and control means for the control winding of said member and said motor, inclusive of said switches and further including means operable to energize said control winding and said motor, the last mentioned means also being operable to initiate deenergization of said control winding and of said motor, said control winding being deenergized following the last mentioned operation of the last mentioned means, as a result of operation of said second switch to its said second position, and said motor thereafter being deenergized as a result of the aforestated operation of the first mentioned switch.

5. In combination, a switching controller having a rotatable operating shaft, a wheel fixed to said shaft and having a plurality of slots and a corresponding number of complemental teeth formed about its peripheral edge, an electromagnetically controlled plunger biased for movement into engagement with said wheel within any slot or on any tooth thereof and movable out of engagement therefrom upon energization of its control winding, said plunger when engaged with said wheel within a slot thereof locking said shaft against rotation, a switch controlled by said plunger and operable to open-circuit condition whenever said plunger engages with said wheel within a slot thereof, a normally closed switch, means for opening the last mentioned switch each time said wheel advances in its rotation an angular distance corresponding to that between adjacent slots, an electric motor, driving connections between said operating shaft and the motor shaft, and control means for the plunger control winding and said motor, inclusive of said switches, and further including means operable to energize said plunger control winding and said motor to afford drive of said shaft, the last mentioned means also being operable to initiate deenergization of said plunger control winding and of said motor, said plunger control winding being deenergized, following the last mentioned operation of said last mentioned means, as a result of opening of the last mentioned switch, and said motor thereafter being deenergized as a result of the aforestated operation of the first mentioned switch.

6. In combination, a switching controller having an operating shaft rotatable in reverse directions, a wheel fixed to said shaft and having a plurality of slots and a corresponding number of complemental teeth formed about its peripheral edge, an electromagnetically controlled plunger biased for movement into engagement with said wheel within any slot or on the end of any tooth thereof and movable out of engagement therefrom upon energization of its control winding, said plunger when engaged with said wheel within a slot thereof locking said shaft against rotation, a switch controlled by said plunger and operable to open-circuit condition whenever said plunger engages with said wheel within a slot thereof, a normally closed switch, means for opening the last mentioned switch each time said wheel advances in its rotation an angular distance corresponding to that between adjacent slots, a reversible electric motor, driving connections between said operating shaft and the motor shaft, and control means for the plunger control winding and said motor, inclusive of said switches, and further including means operable to energize said plunger control winding and said motor to afford drive of said shaft in reverse directions selectively, the last mentioned means also being operable to initiate deenergization of said plunger control winding and of said motor, said plunger control winding being deenergized, following the last mentioned operation of said last mentioned means, as a result of opening of said last mentioned switch, and said motor thereafter being deenergized, as a result of the aforestated operation of the first mentioned switch.

7. In combination, a switching controller having a rotatable operating shaft, a wheel fixed to said shaft and having a plurality of slots and a corresponding number of complemental teeth formed about its peripheral edge, an electromagnetically controlled plunger biased for movement into engagement with said wheel within any slot or on any tooth thereof and movable out of engagement therefrom upon energization of its control winding, said plunger when engaged with said wheel within a slot thereof locking said shaft against rotation, a switch controlled by said plunger and operable to open-circuit condition whenever said plunger engages with said wheel within a slot thereof, a normally closed switch, a second wheel rotatably mounted on said shaft and having notches and teeth formed about its peripheral edge corresponding in number to the slots and teeth, respectively, of the first mentioned wheel, means affording a lost motion driving connection between said wheels, a pivotally supported lever biased in a direction such that a part thereof continuously engages with the edge of said second wheel, said lever upon take-up of lost motion between said wheels being afforded oscillatory movement to mechanically open the last mentioned switch each time said first mentioned wheel advances in its rotation an angular distance corresponding to that between adjacent slots thereof, a reversible electric motor, driving connections between said operating shaft and the motor shaft, and control means for the plunger control winding and said motor, inclusive of said switches, and further including means operable to energize said plunger control winding and said motor to afford drive of said shaft in reverse directions selectively, the last mentioned means also being operable to initiate deenergization of said plunger control winding and of said motor, said plunger control winding being deenergized, following the last mentioned operation of said last mentioned means, as a result of opening of said switch, and said motor thereafter being deenergized as a result of the aforestated operation of the first mentioned switch.

8. In combination, a switching controller having a rotatable operating shaft, a wheel fixed to said shaft and having a plurality of slots and a corresponding number of complemental teeth formed about its peripheral edge, an electromagnetically controlled plunger biased for movement into engagement with said wheel within any slot or on any tooth thereof and movable out of engagement therefrom upon energization of its control winding, said plunger when engaged with said wheel within a slot thereof locking said wheel and said shaft against rotation, a switch controlled by said plunger and operable to open-circuit condition whenever said plunger engages with said wheel within a slot thereof, a normally closed switch, a second wheel rotatably mounted on said shaft and having notches and teeth formed about its peripheral edge corresponding in number to the slots and teeth, respectively, of the first mentioned wheel, means affording a lost motion driving connection between said wheels, a pivotally supported lever biased in a direction such that a part thereof continuously engages with the edge of said second wheel, said lever upon takeup of lost motion between said wheels being afforded oscillatory movement to mechanically open the last mentioned switch each time said first mentioned wheel advances in its rotation an angular distance corresponding to that between adjacent slots thereof, a reversible electric motor, driving connections including a slip clutch between said operating shaft and the motor shaft, and control means for the plunger control winding and said motor, inclusive of said switches, and further including means operable to energize said plunger control winding and said motor to afford drive of said shaft in reverse directions selectively, the last mentioned means also being operable to initiate deenergization of said plunger control winding and of said motor, said plunger control winding being deenergized following the last mentioned operation of said last mentioned means, as a result of opening of said switch, said motor thereafter being deenergized as a result of the aforestated operation of the first mentioned switch, said slip clutch providing by slippage between elements thereof for dissipation of driving torque following locking of said shaft.

9. In combination, a switching controller having an operating shaft rotatable in reverse directions, a wheel fixed to said shaft and having a plurality of slots and a corresponding number of complemental teeth formed about its peripheral edge, an electromagnetically controlled plunger biased for movement into engagement with said wheel within any slot or on any tooth thereof and movable out of engagement therefrom upon energization of its control winding, said plunger when engaged with said wheel within a slot thereof locking said shaft against rotation, a switch controlled by said plunger and operable to open-circuit condition whenever said plunger engages said wheel within a slot thereof, a normally closed switch, means for mechanically opening the last mentioned switch each time said wheel advances in its rotation an angular distance corresponding to that between adjacent slots, a reversible electric motor, driving connections between said operating shaft and the motor shaft, a source of electrical power, electroresponsive means energizable to supply said motor with power from said source for operation in one direction, second electroresponsive means energizable to supply said motor with power from said source for operation in the opposite direction, an electromagnetic relay energizable to connect the control windings of said plunger and of the first mentioned electroresponsive means across said source, a second electromagnetic relay energizable to connect the control windings of said plunger and of said second electroresponsive means across said source, and means for energizing and deenergizing the control windings of said relays selectively, the last mentioned switch being in circuit with the plunger control winding and if closed when either of the relays is deenergized affording a maintaining circuit therefor until subsequently opened by the first mentioned means, the first mentioned switch being in circuit with the control windings of said electroresponsive means and when closed providing a maintaining circuit for delaying deenergization of either of the latter windings until said plunger engages with said wheel within a slot thereof.

10. In combination, a switching controller having an operating shaft rotatable in reverse directions, a wheel fixed to said shaft and having a plurality of slots and a corresponding number of complemental teeth formed about its peripheral edge, an electromagnetically controlled plunger biased for movement into engagement with said wheel within any slot or on any tooth thereof and movable out of engagement therefrom upon energization of its control winding, said plunger when engaged with said wheel within a slot thereof locking said shaft against rotation, a switch controlled by said plunger and operable to open-circuit condition whenever said plunger engages said wheel within a slot thereof, a normally closed switch, means for mechanically opening the last mentioned switch each time said wheel advances in its rotation an angular distance corresponding to that between adjacent slots, a reversible electric motor, driving connections between said operating shaft and the motor shaft, a source of electrical power, electroresponsive means energizable to supply said motor with power from said source for operation in one direction, second electroresponsive means energizable to supply said motor with power from said source for operation in the opposite direction, an electromagnetic relay energizable to connect the control windings of said plunger and of the first mentioned electroresponsive means across said source, a second electromagnetic relay energizable to connect the control windings of said plunger and of said second electroresponsive means across said source, means for energizing and deenergizing the control windings of said relays selectively, the last mentioned switch being in circuit with the plunger control winding and if closed when either of the relays is deenergized affording a maintaining circuit therefor until subsequently opened by the first mentioned means, the first mentioned switch being in circuit with the control windings of said electroresponsive means and when closed providing a maintaining circuit for delaying deenergization of either of the latter windings until said plunger engages with said wheel within a slot thereof, and means for effecting deenergization of the then energized electroresponsive means and said plunger control winding when said shaft is rotated to predetermined limits in either direction.

11. The combination with a drum type circuit controller comprising a frame, an operating shaft rotatably supported thereby, a plurality of switches supported by said frame in rows disposed in an arc about said shaft, a plurality of actuating elements for said switches, and cams on said shaft affording through the medium of said shaft by rotary movements thereof operation of said elements, of an electric motor, driving connections between said motor and said shaft, an element on said shaft having means defining for said shaft a plurality of definite rotary spaced operating positions, a reciprocably movable member biased for movement into engagement with said element and in cooperation with said means affording locking of said shaft in any one of its operating positions, electroresponsive means energizable to move said member out of engagement with said element, and means for controlling the energization and deenergization of said motor and said electroresponsive means comprising means acting to insure deenergization of said electroresponsive means and locking of said shaft in a definite operating position prior to deenergization of said motor.

12. The combination with a drum type circuit controller comprising a frame, an operating shaft rotatably supported thereby, a plurality of switches supported by said frame in rows disposed in an arc about said shaft, a plurality of actuating elements for said switches, and cams on said shaft affording through the medium of said shaft by rotary movements thereof operation of said elements, of a wheel fixed to said shaft and having a plurality of slots and a corresponding number of complemental teeth formed about its peripheral edge, an electromagnetically controlled plunger biased for movement into engagement with said wheel within any slot or on the end of any tooth thereof and movable out of engagement therefrom upon energization of its control winding, said plunger when engaged with said wheel within a slot thereof locking said shaft against rotation, a switch controlled by said plunger and operable to open-circuit condition whenever said plunger engages with said wheel within a slot thereof, a normally closed switch, means for opening the last mentioned switch each time said wheel advances in its rotation an angular distance corresponding to that between adjacent slots, a reversible electric motor, driving connections between said operating shaft and the motor shaft, and control means for the plunger control winding and said motor, inclusive of said switches, and further including means operable to energize said plunger control winding and said motor to afford drive of said shaft in reverse directions selectively, the last mentioned means also being operable to initiate deenergization of said plunger control winding and of said motor, said plunger control winding being deenergized, following the last mentioned operation of said last mentioned means, as a result of opening of said last mentioned switch, and said motor thereafter being deenergized, as a result of the aforestated operation of the first mentioned switch.

13. The combination with a drum type circuit controller comprising a frame, an operating shaft rotatably supported thereby, a plurality of switches supported by said frame in rows disposed in an arc about said shaft, a plurality of actuating elements for said switches, and cams on said shaft affording through the medium of said shaft by rotary movements thereof operation of said elements, of a wheel fixed to said shaft and having a plurality of slots and a corresponding number of complemental teeth formed about its peripheral edge, an electromagnetically controlled plunger biased for movement into engagement with said wheel within any slot or on any tooth thereof and movable out of engagement therefrom upon energization of its control winding, said plunger when engaged with said wheel within a slot thereof locking said shaft against rotation, a switch controlled by said plunger and operable to open-circuit condition whenever said plunger engages with said wheel within a slot thereof, a normally closed switch, a second wheel rotatably mounted on said shaft and having notches and teeth formed about its peripheral edge corresponding in number to the slots and teeth, respectively, of the first mentioned wheel, means affording a lost motion driving connection between said wheels, a pivotally supported lever biased in a direction such that a part thereof continuously engages with the edge of said second wheel, said lever upon take-up of lost motion between said wheels being afforded oscillatory movement to mechanically open the last mentioned switch each time said first mentioned wheel advances in its rotation an angular distance corresponding to that between adjacent slots thereof, a reversible electric motor, driving connections between said operating shaft and the motor shaft, and control means for the plunger control winding and said motor, inclusive of said switches, and further including means operable to energize said plunger control winding and said motor to afford drive of said shaft in reverse directions selectively, the last mentioned means also being operable to initiate deenergization of said plunger control winding and of said motor, said plunger control winding being deenergized, following the last mentioned operation of said last mentioned means, as a result of opening of said last mentioned switch, said switch and said motor thereafter being deenergized as a result of the aforestated operation of the first mentioned switch.

14. The combination with a drum type circuit controller comprising a frame, an operating shaft rotatably supported thereby, a plurality of switches supported by said frame in rows disposed in an arc about said shaft, a plurality of actuating elements for said switches, and cams on said shaft affording through the medium of said shaft by rotary movements thereof operation of said elements, of a wheel fixed to said shaft and having a plurality of slots and a corresponding number of complemental teeth formed about its peripheral edge, an electromagnetically controlled plunger biased for movement into engagement with said wheel within any slot or on any tooth thereof and movable out of engagement therefrom upon energization of its control winding, said plunger when engaged with said wheel within a slot thereof locking said shaft against rotation, a switch controlled by said plunger and operable to open-circuit condition whenever said plunger engages said wheel within a slot thereof, a normally closed switch, means for mechanically opening the last mentioned switch each time said wheel advances in its rotation an angular distance corresponding to that between adjacent slots, a reversible electric motor, driving connections between said operating shaft and the motor shaft, a source of electrical power, electro-responsive means energizable to supply said motor with power from said source for operation in one direction, second electro-responsive means energizable to supply said motor with power from said source for operation in the opposite direction, an electromagnetic relay energizable to connect the control windings of said plunger and of the first mentioned electroresponsive means across said source, a second electromagnetic relay energizable to connect the control windings of said plunger and of said second electroresponsive means across said source, means for energizing and deenergizing the control windings of said relays selectively, the last mentioned switch being in circuit with the plunger control winding and if closed when either of the relays is deenergized affording a maintaining circuit therefor until subsequently opened by the first mentioned means, the first mentioned switch being in circuit with the control windings of said electroresponsive means and when closed providing a maintaining circuit for delaying deenergization of either of the latter windings until said plunger engages with said wheel within a slot thereof, and means for effecting deenergization of the then energized electroresponsive means and said plunger control winding when said shaft is rotated to predetermined limits in either direction.

15. The combination with a drum type circuit controller comprising a frame, an operating shaft rotatably supported thereby, a plurality of switches supported by said frame in rows disposed in an arc about said shaft, a plurality of actuating elements for said switches, and cams on said shaft affording through the medium of said shaft by rotary movements thereof operation of said elements, of a wheel fixed to said shaft and having a plurality of slots and a corresponding number of complemental teeth formed about its peripheral edge, an electromagnetically controlled plunger biased for movement into engagement with said wheel within any slot or on any tooth thereof and movable out of engagement therefrom upon energization of its control winding, said plunger when engaged with said wheel within a slot thereof locking said shaft against rotation, a switch controlled by said plunger and operable to open-circuit condition whenever said plunger engages said wheel within a slot thereof, a normally closed switch, means for mechanically opening the last mentioned switch each time said wheel advances in its rotation an angular distance corresponding to that between adjacent slots, a source of single phase power supply, a single phase motor having a pair of field windings energizable selectively to afford drive of said motor in reverse directions, electroresponsive means energizable to connect one of the motor field windings across said source, second electroresponsive means energizable to connect the other motor field winding across said source, an electromagnetic relay energizable to connect the plunger control winding and the first mentioned electroresponsive means across said source, a second electromagnetic relay energiz-
able to connect said plunger control winding and said second electroresponsive means across said source, means for energizing and deenergizing said relays selectively, the last mentioned switch being connected in circuit with said plunger control winding and if closed when either of said relays is deenergized, affording a maintaining circuit therefor until opened by the first mentioned means, the first mentioned switch being in circuit with the control windings of said electroresponsive means and when closed providing a maintaining circuit for delaying deenergization of either of the latter windings until said plunger engages with said wheel within a slot thereof, and means operable upon rotation of said shaft in predetermined limits in reverse directions to deenergize the then energized electroresponsive means and said plunger control winding.

16. In combination, a switching controller having an operating shaft rotatable in reverse directions, a wheel fixed to said shaft and having a plurality of like, equally spaced slots and a corresponding number of complemental teeth formed about its peripheral edge, an electromagnetically controlled plunger biased for movement into engagement with said wheel within any slot or on the end of any tooth thereof and movable out of engagement therefrom upon energization of its control winding, said plunger when engaged with said wheel within a slot thereof locking said shaft against rotation, a switch controlled by said plunger and operable to open-circuit condition whenever said plunger engages with said wheel within a slot thereof, a normally closed switch, means for opening the last mentioned switch each time said wheel advances in its rotation an angular distance corresponding to that between adjacent slots, a reversible electric motor, driving connection between the motor shaft and said wheel comprising reduction gearing and a friction clutch between said gearing and said wheel, and control means, inclusive of said switches, for the plunger control winding and said motor and further including means operable to energize said plunger control winding and said motor to afford drive of said shaft in reverse directions selectively, the last mentioned means also being operable to initiate deenergization of said plunger control winding and of said motor, said plunger control winding being deenergized, following the last mentioned operation of the last mentioned means, as a result of opening of said last mentioned switch, said motor thereafter being deenergized as a result of the aforestated operation of the first mentioned switch, said friction clutch affording by slippage between it and said wheel dissipation of the driving torque following locking of said shaft.

17. In combination, first and second switching controllers each of which is provided with an operating shaft, an electric motor, driving connections between said motor and the operating shaft of said first controller, driving connections between said operating shafts affording drive of said second controller a partial revolution each time the shaft of said first controller is rotated through a predetermined angle each revolution thereof, an element on said shaft of said first controller having means defining for such shaft a plurality of definite, rotary spaced operating positions, a reciprocably movable member biased for movement into engagement with said element and in cooperation with said means affording locking of the controller shafts in definite operating positions, electroresponsive means energizable to move said member out of engagement with said element, and means for controlling the energization and deenergization of said motor and said electroresponsive means comprising means acting to insure deenergization of said electroresponsive means and locking of said shafts in definite operating positions prior to deenergization of said motor.

18. In combination, first and second switching controllers each of which is provided with an operating shaft rotatable in reverse directions, driving connections between said operating shafts affording drive of the shaft of said second controller a partial revolution each time the shaft of said first controller is rotated through a predetermined angle in each revolution thereof, a wheel fixed to said shaft of said first controller and having a plurality of slots and a corresponding number of complemental teeth formed about its peripheral edge, an electromagnetically controlled plunger biased for movement into engagement with said wheel within any slot or on any tooth thereof and movable out of engagement therefrom upon energization of its control winding, said plunger when engaged with said wheel within a slot thereof locking the controller shafts against rotation, a switch controlled by said plunger and being operable to open-circuit condition whenever said plunger engages with said wheel within a slot thereof, a normally closed switch, means for opening the last mentioned switch each time said wheel advances in its rotation an angular distance corresponding to that between adjacent slots, a reversible electric motor, driving connections between the shaft of said first controller and the motor shaft, and control means inclusive of said switches for the plunger control winding and said motor, and further including means operable to energize said plunger control winding and said motor to afford drive of the shaft of said first controller in reverse directions selectively, the last mentioned means also being operable to initiate deenergization of said plunger control winding and of said motor, said plunger control winding being deenergized, following the last mentioned operation of said last mentioned means, as a result of opening of said last mentioned switch, said motor thereafter being deenergized as a result of the aforestated operation of the first mentioned switch.

19. In combination, first, second and third switching controllers each of which is provided with an operating shaft rotatable in reverse directions, driving connections between the operating shafts of said first and second controllers affording drive of the shaft of said second controller a partial revolution each time the shaft of said first controller is rotated through a predetermined angle in each revolution thereof, driving connections between the operating shafts of said first and third controllers providing drive of the shaft of said third controller in a constant ratio to that of the shaft of said first controller, a wheel fixed to the shaft of said first controller and having a plurality of slots and a corresponding number of complemental teeth formed about its peripheral edge, an electromagnetically controlled plunger biased for movement into engagement with said wheel within any slot or on any tooth thereof and movable out of engagement therefrom upon energization of its control winding, said plunger when engaged with said wheel within a slot thereof locking the shafts against rotation, a switch controlled by said plunger and being operable to open-circuit condition whenever said plunger engages with said wheel within a slot thereof, a normally closed switch, means for opening the last mentioned switch each time said wheel advances in its rotation an angular distance corresponding to that between adjacent slots, a reversible electric motor, driving connections between the shaft of the first controller and the motor shaft, and control means inclusive of said switches for the plunger control winding and said motor, and further including means operable to energize said plunger control winding and said motor to afford drive of the shaft of said first controller in reverse directions selectively, the last mentioned means also being operable to initiate deenergization of said plunger control winding and of said motor, said plunger control winding being deenergized, following the last mentioned operation of said last mentioned means, as a result of opening of said last mentioned switch, and said motor thereafter being deenergized as a result of the aforestated operation of the first mentioned switch.

20. In combination, first, second and third switching controllers each of which is provided with an operating shaft rotatable in reverse directions, driving connections between the operating shafts of said first and second controllers affording drive of the shaft of said second controller a partial revolution each time the shaft of said first controller is rotated through a predetermined angle in each revolution thereof, driving connections between the operating shafts of said first and third controllers providing drive of the shaft of said third controller in a constant ratio to that of the shaft of said first controller, a wheel fixed to the shaft of said first controller and having a plurality of slots and a corresponding number of complemental teeth formed about its peripheral edge, an electromagnetically controlled plunger biased for movement into engagement with said wheel within any slot or on any tooth thereof and movable out of engagement therefrom upon energization of its control winding, said plunger when engaged with said wheel within a slot thereof locking the shafts against rotation, a switch controlled by said plunger and being operable to open-circuit condition whenever said plunger engages with said wheel within a slot thereof, a normally closed switch, means for opening the last mentioned switch each time said wheel advances in its rotation an angular distance corresponding to that between adjacent slots, a reversible electric motor, driving connections between the shaft of the first controller and the motor shaft, a source of electrical power, electroresponsive means for supplying said motor with power from said source for operation in one direction, second electroresponsive means for supplying said motor with power from said source for operation in the opposite direction, an electromagnetic relay energizable to connect the control windings of said plunger and the first mentioned electroresponsive means to said source, a second electromagnetic relay energizable to connect the control windings of said plunger and said second electroresponsive means to said source, means operable to energize and deenergize said relays selectively, said last mentioned switch being in circuit with the control winding of said plunger and if closed, following deenergization of either of said relays, affording it a maintaining circuit until it is opened by said first mentioned means, the first mentioned switch being in circuit with the control windings of said electroresponsive means and delaying their deenergization until said plunger engages said wheel within a slot thereof, and means operable upon rotation of one of said controller operating shafts to predetermined limits in reverse directions, to deenergize the then energized electroresponsive means and the control winding of said plunger.

21. In combination, first and second drum type switching controllers each of which is provided with an operating shaft rotatable in reverse directions, intermittent type gear driving means between the shafts of said controllers affording drive of the shaft of said second controller a predetermined part of a single revolution each time the shaft of said first controller is driven through a corresponding part of each revolution thereof, and means limiting the drive of the shaft of said second controller to a predetermined whole number of such partial revolutions in reverse directions.

22. In combination, first and second drum type switching controllers each of which comprises a rotatable operating shaft, a plurality of switches supported in rows disposed in an arc about said shaft, a plurality of actuating elements for said switches, and cams on said shaft affording through the medium of said shaft by rotary movements thereof operation of said elements, intermittent type gear driving means between the shafts of said controllers affording drive of the shaft of said second controller through a predetermined part of a single revolution each time the shaft of said first controller is driven through a corresponding part of each revolution thereof, and means limiting said shaft of said second controller to a predetermined whole number of such partial revolution in reverse directions.

23. In combination, first and second drum type switching controllers each of which comprises a rotatable operating shaft, a plurality of switches supported in rows disposed in an arc about said shaft, a plurality of actuating elements for said switches, and cams on said shaft affording through the medium of said shaft by rotary movements thereof operation of said elements, intermittent type gear driving means between the shafts of said controllers affording drive of the shaft of said second controller through a predetermined part of a single revolution each time the shaft of said first controller is driven through a corresponding part of each revolution thereof, and means limiting said shaft of said second controller to a predetermined whole number of such partial revolutions in reverse directions, said shaft of said first controller, following drive of said shaft of said second controller to either of its limits, being capable of further drive through a given angle, the last mentioned means thereafter acting through said shaft of said second controller and said gear driving means to prevent drive of either of said shafts.

24. In combination, first and second drum type switching controllers each of which comprises a rotatable operating shaft, a plurality of switches supported in rows disposed in an arc about said shaft, a plurality of actuating elements for said switches, and cams on said shaft affording through the medium of said shaft by rotary movements thereof operation of said elements, a frame work affording support of said controllers with their operating shafts in concentric alinement, intermittent type gear driving means between the shafts of said controllers affording drive of the shaft of said second controller through a predetermined part of a single revolution each time the shaft of said first controller is driven through a corresponding part of each revolution thereof, and means limiting said shaft of said second controller to a predetermined whole number of such partial revolutions in reverse directions, said shaft of said first controller, following drive of said shaft of said second controller to either of its limits, being capable of further drive through a given angle, the last mentioned means thereafter acting through said shaft of said second controller and said gear driving means to prevent drive of either of said shafts.

25. In combination, first, second and third drum-type switching controllers each of which is provided with an operating shaft rotatable in reverse directions, mechanical driving connections between the shafts of said first and second controllers affording drive of the shaft of said second controller a partial revolution each time the shaft of the first controller is driven through a corresponding part of each revolution thereof, and mechanical driving connections between the shafts of said first and third controllers affording drive of the shaft of said third controller concurrently with said shaft of said first controller.

26. In combination, first, second and third switching controllers each of which is provided with an operating shaft rotatable in reverse directions, intermittent gear type driving means between the shafts of said first and second controllers affording drive of the shaft of said second controller a partial revolution each time the shaft of said first controller is driven through a corresponding part of each revolution thereof, and a gear train driving connection between the shafts of said first and third controllers affording drive of the shaft of said third controller at a constant ratio with said shaft of said first controller.

27. In combination, first, second and third switching controllers each of which is provided with an operating shaft rotatable in reverse directions, intermittent gear type driving means between the shafts of said first and second controllers affording drive of the shaft of said second controller a partial revolution each time the shaft of said first controller is driven through a corresponding part of each revolution thereof, and a gear train driving connection between the shafts of said first and third controllers affording drive of the shaft of said third controller at a constant ratio with said shaft of said first controller, and means limiting said shaft of said second controller to a predetermined whole number of such partial revolutions in reverse direction, said shafts of said first and third controllers, following drive of said shaft of said second controller to either of its limits, being capable of drive through given angles respectively, the last mentioned means thereafter acting through said shaft of said second controller, the first mentioned means and said gear train driving connection to prevent further rotation of any of said shafts.

28. In combination, first and second drum type switching controllers each of which comprises an operating shaft rotatable in reverse directions, a plurality of switches in rows disposed in an arc about said shaft, a plurality of actuating elements for said switches, and cams on said shaft affording through the medium of said shaft by rotary movements thereof operation of said elements, a third switching controller comprising an operating shaft rotatable in reverse directions, a plurality of switches supported in a row, a plurality of actuating elements for the latter switches, a second shaft, cams rotatably mounted on said second shaft, elements carried on the last mentioned operating shaft individual to each of the latter cams and driving connections between each of the last mentioned elements and its associated cam affording operation of the last mentioned actuating element by rotary movement of said last mentioned operating shaft, intermittent type gear driving connections between the operating shafts of said first and second controllers affording drive of the operating shaft of said second controller a partial revolution each time the operating shaft of said first controller is driven through a corresponding part of each revolution thereof, and a gear train driving connection between the operating shafts of said first and third controllers affording drive of the operating shaft of said third controller at a constant ratio with said operating shaft of said first controller.

29. In combination, first and second drum type switching controllers each of which comprises an operating shaft rotatable in reverse directions, a plurality of switches in rows disposed in an arc about said shaft, a plurality of actuating elements for said switches, and cams on said shaft affording through the medium of said shaft by rotary movements thereof operation of said elements, a third switching controller comprising an operating shaft rotatable in reverse directions, a plurality of switches supported in a row, a plurality of actuating elements for the latter switches, a second shaft, cams rotatably mounted on said second shaft, elements carried on the last mentioned operating shaft individual to each of the latter cams and driving connections between each of the last mentioned elements and its associated cam affording operation of the last mentioned actuating element by rotary movement of said last mentioned operating shaft, intermittent type gear driving connections between the operating shafts of said first and second controllers affording drive of the operating shaft of said second controller a partial revolution each time said operating shaft of said first controller is driven through a corresponding part of each revolution thereof, and a gear train driving connection between the operating shaft of said first and third controllers affording drive of the operating shaft of said third controller at a constant ratio with said operating shaft of said first controller, and a framework for supporting said controllers, said gear driving connections and said gear train in a manner such that the operating shafts of said first and second controllers are in concentric alinement and the operating shaft of said third controller is in parallel but offset relation to the operating shaft of said second controller.

THEODORE B. JOCHEM.

References Cited in the file of this patent
UNITED STATES PATENTS

| Number | Name | Date |
|---|---|---|
| 780,550 | Carichoff | Jan. 24, 1905 |
| 982,897 | Stull | Jan. 31, 1911 |
| 2,480,589 | McKenney | Aug. 30, 1949 |